United States Patent
Schipper et al.

[11] Patent Number: 5,987,136
[45] Date of Patent: Nov. 16, 1999

[54] IMAGE AUTHENTICATION PATTERNING

[75] Inventors: John F. Schipper, Palo Alto; Allan M. Pelley, Milpitas, both of Calif.

[73] Assignee: Trimble Navigation Ltd., Sunnyvale, Calif.

[21] Appl. No.: 08/991,314

[22] Filed: Dec. 16, 1997

Related U.S. Application Data

[63] Continuation of application No. 08/905,842, Aug. 4, 1997, Pat. No. 5,764,770.

[51] Int. Cl.$^6$ .................................................... H04L 9/00
[52] U.S. Cl. ................................................ 380/25; 380/54
[58] Field of Search .......................................... 380/25, 54

[56] References Cited

U.S. PATENT DOCUMENTS 5,764,770   6/1998   Schipper et al. ....................... 380/25

*Primary Examiner*—Salvatore Cangialosi
*Attorney, Agent, or Firm*—John Schipper

[57] ABSTRACT

Apparatus for producing a self-authenticating visual image of a selected view, using a digital image forming means, such as a digital camera, together with a position determining system that provides position information, including location and/or angular orientation and/or time of observation at the time a digital image is formed and/or distance from the camera to a selected object. The digital image of the selected view is presented as an array of pixels with associated pixel values. The position information is incorporated in the digital image by altering selected pixel bit values for a selected authentication pattern P of pixels in a chosen subset CS of the pixel array; and this selected pattern may be determined using the position information. The position information may be encrypted, using an encryption key based on position information, and may be stored separate from, or as part of, the digital image. The authentication pattern is represented by an authentication key or indicium, a single number or an ordered sequence of numbers, that is transmitted with the modified digital image and incorporated position information. The authentication pattern P is preferably chosen so that any circle or other connected pixel region of diameter at least equal to a selected number D contains at least one pixel from the subset CS. The pixel array may be overlaid by a set of polygons, such as triangles, rectangles, parallelograms or hexagons, with at least one pixel from the subset CS in each polygon.

30 Claims, 9 Drawing Sheets

IMAGE AUTHENTICATION PATTERNING

This is a continuation of application Ser. No. 08/905,842 filed on Aug. 4, 1997 which is hereby incorporated by reference to this specification, now U.S. Pat. No. 5,764,770.

FIELD OF THE INVENTION

This invention relates to identification of the circumstances under which a visual image was formed, and authentication of the image.

BACKGROUND OF THE INVENTION

The parallel development of telecommunications and of computers over the last 25 years has allowed an awesome increase in data throughput and data analysis. Much of the business information that was once hand delivered by a known and trusted intermediary is now delivered electronically. For example, the Internal Revenue Service now encourages electronic filing of tax returns and related information and provides facilities for no-cost data transmission in some instances. Financial transactions, such as funds transfer and payment of invoices, are now routinely handled by electronic messaging. Electronic offices, both mobile and stationary, are now commonplace, along with cellular telephones, mobile facsimile machines and other accoutrements of this new age.

Unfortunately, this rise in computer power and data transmission power has brought an increase in the possibility of electronic mischief, unintentional and intentional, benign and injurious. A transmitter of an encrypted message is usually concerned with (1) delivery of the message only to its intended recipient(s) and (2) encryption of the message so that a message received by an unintended recipient cannot be decrypted to become privy to the intelligence contained in the message. However, the recipient of this message has somewhat different concerns, including a means of verifying that the message received was, in fact, transmitted by the putative sender. The message transmitter is concerned with secrecy and selectivity of the message recipients. The intended recipient is concerned with receiving and taking appropriate action only on messages for which the putative message source is the true or authentic source. If the putative source is not the actual source, the message may contain selective disinformation, intended to mislead the recipient or to cause the recipient to take action that the recipient would not otherwise take. For example, the Time magazine issue for Jun. 26, 1995, on page 65, reports some of the problems faced by Internet participants who are receiving fake e-mail messages, transmitted by someone other than the asserted sender of such messages.

Opto-electronic technology now allows a user to form an image using a digital camera, defined here to mean a visually perceptible image that is digitally expressed as an assembly of picture elements or pixels. Once an image is formed by opto-electronic means, the user may wish to include certain accompanying information indicating the circumstances under which the image was formed. If the image is to be used for some legal or related purpose, the user may wish to insure that the image or the accompanying information not be tampered with or corrupted.

Relatively few workers in electronic communications have seriously considered approaches for authenticating the putative source of information in the form of text or an image that is delivered electronically or by some means other than a trusted intermediary. Encryption using destination addresses using a TDMA satellite communications system is disclosed in U.S. Pat. No. 4,418,415, issued to Fennel et al. A common encryption/decryption key is held by all authorized users of a network. This key is EXclusively ORed with the specified destination address, and the output (digital) signal is passed through an encryption engine, on the satellite and at the intended ground-based receiver, using the same key or another key. The encryption engine output signal is then combined with the channel data to be transmitted in another EXclusive OR circuit and transmitted to the network users. Each of the receivers receives the message and reverses the encryption process, using its own destination address as part of the decryption key. However, only the (single) intended receiver produces a cleartext message that is comprehensible.

Hanas et al, in U.S. Pat. No. 4,709,266, disclose use of a satellite scrambling network to provide messages that are scrambled or encrypted differently for different geographical regions. This is useful for distributing scrambled video, voice and data subscriber messages. A master uplink message (ground-to-satellite) is used to control the scrambling or encryption commands that determine the scrambling applied to each geographical area and/or to groups of individual subscribers.

In U.S. Pat. No. 4,860,352, Laurance et al disclose a satellite communication system that provides authentication of a data transmission based upon the location of the data transmitter, as determined by the satellite communication system itself. The message sender transmits a message and the sender's location to a satellite, which retransmits the message and sender location to a ground-based receiver that compares the sender's stated location with the known location for the putative source of the message. Optionally, the message and/or the sender location are encrypted. If the two sets of transmitter location information agree, the message and its source are accepted as valid or authenticated. If the the two sets of such information do not agree, the receiver discards the remainder of this message as originating from an invalid sender. The message originator may be stationary or mobile. In one embodiment, a mobile message originator sends its present location and its location at the time the preceding message was sent, in encrypted text. A receiver receives the preceding location information and compares this with the known preceding location to verify or refute the preceding location of the putative source. In a second embodiment, three spaced apart satellites receive the same message and, based upon differences in time of receipt, determine the present location of the message originator. The message and this present location information are transmitted to a ground-based receiver, which compares the originator's present location with the known preceding location of the message originator, to verify or refute (within certain geographical limits) that the message originator is the putative source of the message. Some of the embodiments appear to require foreknowledge of the location, as a function of time, of the authentic message originator.

The inventors in the Laurance et al patent distinguish between (1) an "active attack," whereby an unauthorized person or the (faulty) transmission channel itself receives and alters the message and subsequently causes the message to be delivered to the recipient, and (2) a "passive attack," whereby an unauthorized person receives but does not alter the message that is delivered to the recipient. A third type of attack may be characterized as origination of a fraudulent message by a non-legitimate source, where the putative message source is not the actual message source. Active and passive attacks have traditionally been combated by message encryption. Once the encryption method is broken and available for use by an unauthorized person, that encryption scheme is less than useless. Successfully combating an active attack and/or fraudulent origination requires more than message encryption: the message source must be authenticated and/or the received message must be verified as unaltered after its transmission by the putative source.

Horne, in U.S. Pat. No. 4,887,296, discloses a three-key cryptographic system for a direct broadcast satellite system, to be used in video broadcasting to a plurality of ground-based receivers, each having a unique address number. A signature key, which is an encryption using the address number for that receiver, is stored in the receiver at the time of manufacturing. At the transmitter, a common key is encrypted, using the unique signature key for a receiver that is targeted for a portion of the message to be transmitted. The data stream contains message portions intended for all receivers and message portions intended for, and decryptable only by, individual receivers. A target receiver decrypts its messages, using the common key and signature key used by the transmitter to encrypt the receiver's portions of the message.

U.S. Pat. No. 4,916,737, issued to Chomet et al, discloses an anti-piracy television program scrambling/descrambling system that allows the encryption/decryption code to be changed periodically (e.g., once per month) by communication from the head end or central station. The receiver's decryption unit has an unalterable ROM portion, containing its unique serial or address number, and an EPROM portion, containing an alterable ROM portion with a look-up table that can be changed by receipt of special signals from the head end.

U.S. Pat. No. 4,993,067, issued to Leopold, discloses a secure satellite-ground communication system that provides over-the-air encryption rekeying. A message transmitted from a proper ground station to the satellite must contain the ground station location. If the location of the ground station is not included in the message, or if this location is included but is not on an approved list maintained by the satellite, the received message is discarded. If the ground station location is acceptable, the satellite accepts the message and rekeys itself according to the rekeying information contained in the remainder of the message. This approach appears to require that the ground stations on the approved list be stationary.

Signal encryption apparatus that uses a common data key component and a specialized data key component, for a plurality of communicating sites, is disclosed in U.S. Pat. No. 5,115,467, issued to Esserman et al. The specialized data include distinct parameter values that are associated with only one communicating site. The encryption generating key depends upon the common data key component and upon the specialized data key component so that the encryption key used for each site may be distinguishable. The invention is useful in receipt and processing of television signals generated at a plurality of fixed sites.

Graziano et al, in U.S. Pat. No. 5,191,613, disclose a knowledge-based system for the electronic equivalent of signature authentication of a document, such as an agreement, transmitted from a sender to a recipient. The document, in electronic form, is temporarily locked into a computer memory so that no modifications can be made to the document or its format. Each of the document signatories then applies its own tests and comparisons to verify electronically that the document is authentic and unaltered. After this authentication process, each signatory affixes its electronically-based signature to the document to activate the terms of the agreement.

In U.S. Pat. No. 5,221,925, Cross discloses a location interrogation system in which a mobile unit, upon receipt of an interrogation signal, transmits its present location in a conventionally encoded format to a central station that has issued the interrogation signal, to assist in tracking the mobile unit.

A verification procedure for mobile stations in a cellular network is disclosed by Raith in U.S. Pat. No. 5,237,612. In response to receipt of a random challenge signal or interrogation, the mobile station transmits to the central station a first response signal, depending only upon an unchanging, commonly-held encryption key, and a second response signal, dependent upon a changeable encryption key. The first and second response signals are analyzed by an authentication algorithm to authenticate, or deny authentication to, the putative mobile station.

U.S. Pat. No. 5,243,652, issued to Teare et al, discloses a communication system for control of access to a location-sensitive remote database. A central station stores and transmits encrypted television material whose encryption key is available only for a viewers in a specified geographical area, as determined by a GPS or Loran location determination system. A secure version of the location history of the mobile user is transmitted to a central facility and compared with the known location history of this user. If the two histories agree, the identity of the user is confirmed, and a decryption key associated with this location history is transmitted to the user, for use in decrypting the encrypted television transmission.

Transmission of encrypted information packages from a central site to a remote site, in response to receipt of a request for specified information from that site, is disclosed in U.S. Pat. No. 5,247,575, issued to Sprague et al. The encryption key is changed periodically (e.g., weekly), but does not depend upon any past information.

Honda et al, in U.S. Pat. No. 5,296,884, discloses a camera that allows recording of location and/or time as a supplement to the frame image, where the location/time information is provided by signals received from a Loran, Decca, Omega or GPS signal source. The location/time information appears to be recorded separately from the camera image, perhaps on an adjacent strip of film. A similar device that uses earlier location-indicating instruments is disclosed by Rick et al in U.S. Pat. No. 4,122,521.

Earlier patents that allow recording of exposure information, exposure time/date, distance to a selected object in view, or local terrain detail, on film or in a viewfinder at the time a camera forms an image on the film, include U.S. Pat. Nos. 3,872,483, issued to Numata et al, No. 3,882,512, issued to Lawrence et al, No. 3,968,505, issued to Kauneckas, No. 4,053,240, issued to Aizawa et al, No. 4,064,515, issued to Mashimo et al, No. 4,149,795, issued to Sakurda et al, No. 4,175,848, issued to Murakami et al, No. 4,361,388, issued to Mlcak et al, No. 4,635,203, issued to Merchant, No. 4,695,959, issued to Lees et al, No. 5,045,937, issued to Myrick, and No. 5,386,117, issued to Piety et al.

A secure communication system for static information is disclosed in U.S. Pat. No. 5,321,753, issued to Gritton. The message transmitted includes a 10-bit static first data field and a 54-bit second data field that changes from one transmission to the next. The 64-bit first and second data fields are encrypted and transmitted to a remote message reader that receives, decrypts and reads the transmitted message.

Goldfine et al disclose a financial or telephone service transaction authentication system, in U.S. Pat. No. 5,343, 529, in which any attempt to gain access to a protected system is thereafter answered and controlled by a centralized authentication agency. In response, the agency issues an identification request, requesting information that is unique to that request; a subsequent attempt by that person to gain access would require submission of different information. If the information supplied by the access seeker matches the information on file, the access seeker identity is authenticated and access is granted.

In U.S. Pat. No. 5,347,580, Molva et al disclose an authentication method using a smartcard to encrypt the presently displayed time with a cryptographically strong key. A public work station receives the encrypted time message, generates one or more values from this message, and further encrypts and/or transmits these values to a server station. The server station uses the received values to authenticate the holder of the smartcard and to accept or reject a message or command from the holder.

A remote control transmitter-receiver pair that cooperatively implement a code transmission sequence that minimizes energy use and protects the communication channel from unauthorized access is disclosed in U.S. Pat. No. 5,349,459, issued to Reed. The transmitter issues a specified sequence of start/stop pulses of different lengths, similar to pulse code modulation, which are received by the receiver and compared with a copy of this sequence. If the sequences agree, the receiver authenticates the transmitter and opens the secured channel to receive the remainder of the message.

Generation of each of two pseudorandom numbers, by an independently chosen number of iterations on initial numbers, is the basis for a cryptographic authentication system disclosed by Koopman et al in U.S. Pat. No. 5,363,448. The two pseudorandom numbers are concatenated and encrypted into a single word. This word is transmitted by or on behalf of a person seeking access to a protected system, and the word is decrypted and deconcatenated to produce the two pseudorandom numbers, for comparison and authentication purposes. Immediately after the concatenated and encrypted word is received, the receiving system locks out receipt of any additional signals for a selected time interval, such as 0.5 sec. Thus, breach of the protected system by rapid, exhaustive, numerical trials is made difficult or impossible.

Blume discloses a system to allow a space platform to distinguish between a friendly object and an unfriendly object in U.S. Pat. No. 5,382,957. The platform, which includes a GPS receiver/processor and antenna, transmits an encrypted interrogation signal to the object, which can be positioned tens or hundreds of kilometers from the platform, requesting certain information including the location coordinates of the object. Simultaneously, the platform uses high directivity radar and line of sight measurements to estimate the object range and the object location coordinates, using the platform's GPS-based knowledge of its own location. A friendly object will reply to the encrypted interrogation signal with an authenticating reply, including the GPS-determined location coordinates of the object. A receiver on the platform receives the object location coordinates from the object and compares these coordinates with its own estimate of the object location coordinates. If the object-supplied object location is within a determinable distance of the platform-supplied object location and all other authenticating replies from the object are appropriate, the platform authenticates the object as a "friendly" object.

In U.S. Pat. Nos. 5,384,846 and 5,388,158, Berson et al disclose methods for authentication of an identification card and the holder thereof. Several physical or other characteristics of the bona fide holder of the card are encrypted and recorded on a magnetic strip on the card, using a public key encryption scheme in which the key is changed from time to time. When the card is presented, the magnetic strip information is reproduced and compared with the corresponding characteristics of the card holder, to verify or refute the putative identity of the card holder. In another embodiment, the contents of a document are compressed, encrypted, encoded and placed on a two-dimensional bar code label for the document, for subsequent decryption and authentication of the document by reversing the process for the information on the label.

A GPS tracking system for a mobile station with physical sensors, relying upon receipt of unprocessed GPS signals that are initially received by the mobile station, is disclosed in U.S. Pat. No. 5,379,224, issued to Brown et al. Segments of the GPS signals received and time stamps are interleaved with sensor measurements of physical data and are transmitted to and processed by a central processing station, for estimation of the location of the mobile station at the time value given by the time stamp, and for examination of the physical sensor data. The GPS signals received from the mobile station are used for location determination, not for authentication of the asserted location of the central station.

Dent et al, in U.S. Pat. No. 5,390,245, disclose system for authentication of a base station and a mobile station that communicates with the base station. A first signal and a second signal are formed at each of the base station and the mobile station, and the base station transmits its first signal to the mobile station. The mobile station compares the received first signal with its own first signal to authenticate, or deny authentication to, the base station/transmitter. The mobile station then transmits its second signal to the base station for a similar authentication procedure by the base station.

A system for controlling the number of concurrently operating copies of a licensed software package is disclosed in U.S. Pat. No. 5,390,297, issued to Barber et al. Each node in a computer network is identified, for example, by number. If a given node requests use of, and contains a valid, unexpired license for, the software package, a license manager permits use of that software package at the given node. If an applicable license is not available at the given node, the license manager interrogates other nodes to find a license for the licensed software package that is not presently being used by that node and transfers the available license to the given node.

U.S. Pat. No. 5,406,619, issued to Akhterruzzaman et al, discloses a user authentication device for messages transmitted telephonically. The authenticator device, about the size of a credit card, is held against a telephone receiver and receives a query number as part of the telephone message. The authentication device uses its own key to transform the query number into an individualized response number that is transmitted as part of the same telephone cal to the query number initiator. Each of the query number and the response number is unique to the telephonic device used for that phone call.

A fire/security/control sensor access system that prevents unauthorized access by remote sensors is disclosed by Sanderford in U.S. Pat. No. 5,408,217. A central processor and a sensor unit communicate using one or more pseudo-random number sequences that is unique for that communicating pair, and each incoming and outgoing message must produce a "match" at the central processor and at the sensor before the transmitting sensor will accept reprogramming of its facility.

Evans discloses a sensor communication system with sensor polling in U.S. Pat. No. 5,440,301. Each remote sensor is polled for its present condition by a centrally located processor, using a unique coded signal that is received and analyzed by a receiver connected to the sensor. If the coded signal has a valid format, information stored in the receiver memory is transmitted in response to receipt of a polling signal.

In U.S. Pat. No. 5,442,342, issued to Kung, a distributed user authentication protocol is disclosed that prevents unauthorized access to any computer that is part of a network. Each network user is issued a coded card with a confidential message authentication code, which must be used to gain access to a computer on the network. The user must present the card and answer a sequence of randomly selected questions. At random times during use of a computer on the network, a user is required to again answer a randomly selected sequence of questions, in order to continue to use the computer.

Apparatus for controlling access to a device, such as an automated teller machine, at a secure location is disclosed by Heath in U.S. Pat. No. 5,451,757. A technician or other worker who seeks access to the device presents an access authentication message, including the worker's personal identification number (PIN), an access code presently stored at the device, and an access code of a portable computer terminal carried by the worker for use with the device. If the PIN and the two access codes are confirmed by the device, the worker is allowed access to the device. If access to the device is allowed, the access code presently stored at the device is immediately replaced by a new access code, to be used when requesting subsequent access to the device.

Steganography, which seeks to authenticate a graphical image by concealing a message in the image, is briefly discussed by S. Walton in "Image Authentication for a Slippery New Age," Dr. Dobb's Journal, April 1995, pp. 18–26. One method of concealment expresses each pixel in an electronic representation of the image in digital form and then alters the least significant bit of a chosen number of pixels to contain an authentication message.

These inventions usually rely upon some unchanging characteristic or combination of characteristics of an entity that seeks access to a protected system or a protected communication channel. The protection offered by these approaches might easily be compromised for a communication channel that is continually or periodically transmitting information. What is needed is an approach that relies in part on the constantly changing information associated with signals produced by a location determination system, to authenticate or verify the location and/or angular orientation of the entity that forms an image that is to be authenticated. Preferably, the information relied upon for, and specification of any pattern(s) used for, image authentication should be accurately and fully transmissible to another person or facility in confidence. Preferably, the approach should accept and work with confidential/encrypted signals and/or with signals that are available for use by any user with an appropriate receiver for a location determination system.

SUMMARY OF THE INVENTION

These needs are met by the invention, which forms a digitally expressed image, using a digital image formation means, such as a digital still camera or a digital video camera (referred to simply as a "digital camera"), and a digital image storage means, and conceals image authentication information concerning the circumstances of formation of the digital image of a selected view within the image itself. Preferably, this image authentication information includes location information and/or angular orientation information and/or information on time of image formation and/or distance from the digital camera to a selected object in a viewfinder for the camera (referred to collectively as "position information") of the digital camera at the time the digital image of the selected view is formed. This position information is provided, in part at least, by a location and/or angular orientation and/or time determination system, referred to as a position determination system ("PDS"), that is connected or attached to the digital camera and operates cooperatively with the digital camera. This position information is incorporated into the digitally expressed image or associated with the digital image.

If the position information is incorporated in the digital image, a chosen subset CS of pixels is selected, from the pixel array PA that forms an electronically or visually perceptible image in the digital camera, and the pixels in this chosen subset are individually altered to contain appropriate parts of the authentication information. This chosen subset CS of pixels for the image is determinable by, or known to, at least one person or facility so that this subset of pixels can be retrieved from the digital image and the authentication information can be recovered and analyzed. The pixels in this chosen subset CS may be contiguous or non-contiguous to each other and may be selected arbitrarily or according to some prescribed form, such as along a straight or curved line of pixels. Preferably, the pixels in the chosen subset CS are chosen so that any connected region of pixels in the pixel array PA with a pixel diameter greater than a selected threshold number will contain at least one pixel from the chosen subset CS.

Optionally, the locations of the chosen subset CS of pixels, or the particular bits within this chosen subset of pixels, whose pixel values are modified to contain the position information is specified by an authentication indicium, which may be a (large) single number or may be an ordered sequence of numbers. This authentication indicium, together with the digital image and associated position information may be transmitted as cleartext or may be encrypted and transmitted in encrypted form, to make it more difficult to alter the digital image or its asserted position information without detection.

Optionally, the position information and/or the specification of the chosen subset CS of pixels in which this information is concealed may be encrypted, using the location and/or orientation and/or time information (optional) provided by the PDS to determine the encryption key.

If the position information and/or the specification of the chosen subset CS is encrypted, a decryption technique, agreed upon in advance by those who are authorized to authenticate the image and position information, is applied to produce a readable message for that recipient. The encryption/decryption process may be a single key process, such as the Data Encryption Standard (DES) developed by IBM and disclosed in U.S. Pat. No. 3,798,360 and related patents, issued to Feistel. Alternatively, the encryption/decryption process may be a public key process, such as the recently developed RSA process, disclosed in U.S. Pat. No. 4,405,829 and related patents, issued to Rivest, Shamir and Adelman. The header and/or trailer of any satellite message would include one or more bits indicating: (1) whether this message is encrypted; (2) the beginning and end of the encrypted portion, if any, of this message; and/or (3) an identification by alphanumeric symbols of the key to be used by the recipient to decrypt any encrypted portion of this message. When the selected recipient's receiver receives an encrypted message and an identification of the decryption key to be used, the receiver could automatically route this message to a decryption module that would read the key identification bits and apply the correct decryption key.

Optionally, the chosen subset of pixels may be partly or fully prescribed using the position information determined by the PDS at the time the digital image is formed by the digital camera.

This invention will be useful where a digital image and its associated authentication information is to be formed, preserved for later display and/or transmitted for use, analysis or display of the digital image by another user.

DESCRIPTION OF BEST MODES OF THE INVENTION

Figure 1:
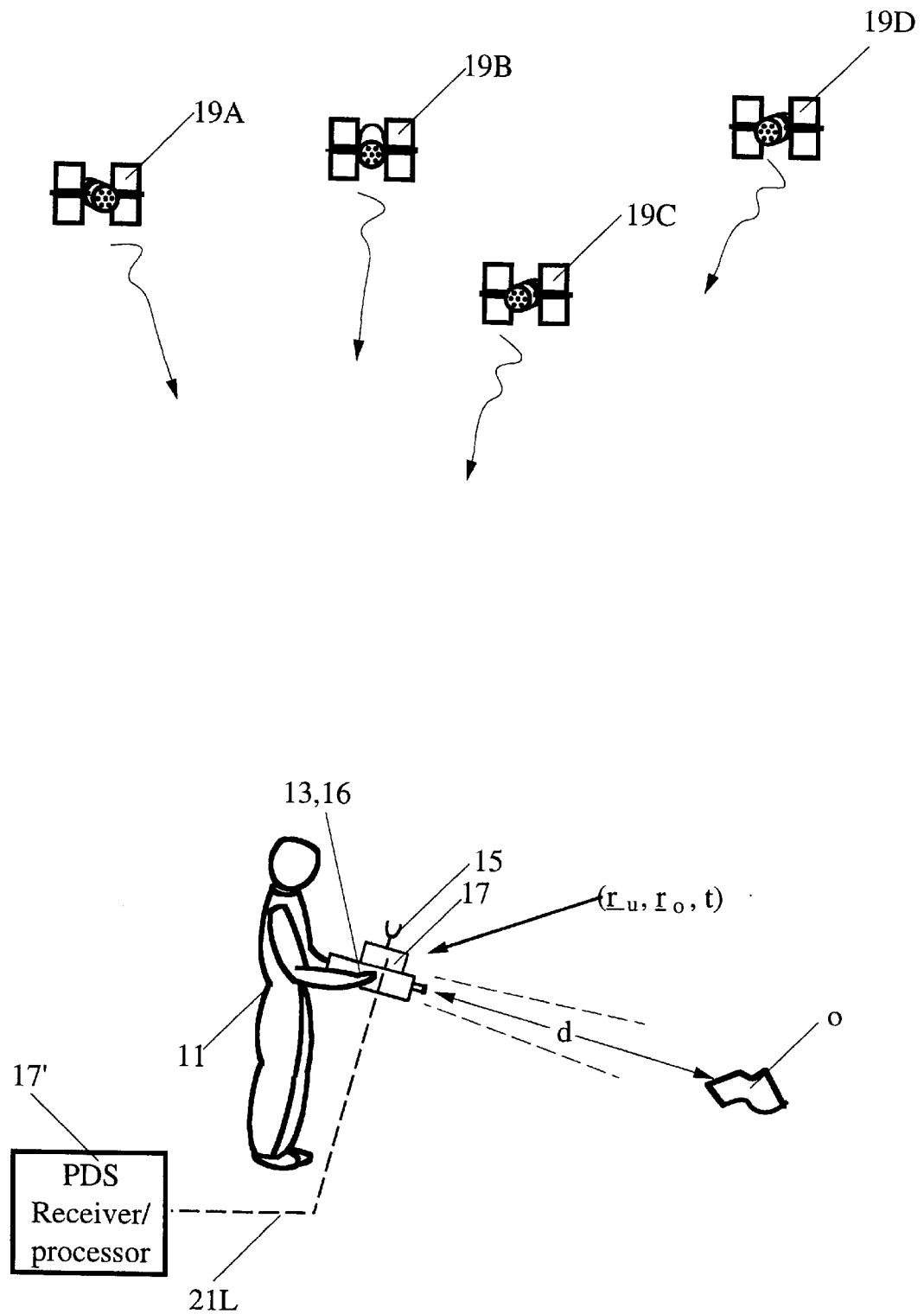
FIGS. 1 and 8 illustrate use of the invention in representative environments, where the location, angular orientation and/or time information for the PDS is provided by satellite sources of PDS signals and by ground-based sources of PDS signals, respectively.
Figure 2:
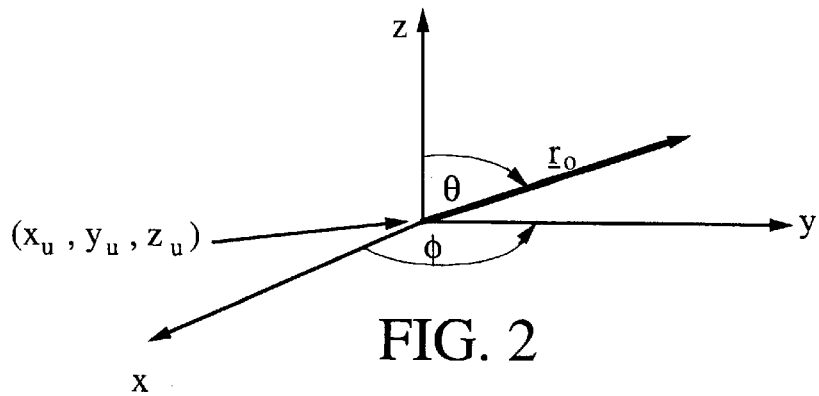
FIG. 2 illustrates the angular coordinates used to determine angular orientation of a digital camera.

FIG. 1 illustrates use of the invention in one environment. A user 11, positioned at a particular location with location vector $r_u = (x_u, Y_u, z_u)$ in a selected coordinate system, points or orients a digitized image forming device ("digital camera") 13 in a selected direction having an orientation vector $r_O = (\cos \phi \sin \theta, \sin \phi \sin \theta, \cos \theta)$, where $\phi$ is the azimuthal angle and $\theta$ is the polar angle of the vector $r_O$, measured relative to the axes of the selected coordinate system, as indicated in FIG. 2. In FIG. 2, for definiteness, the coordinate system used for $(x_u, y_u, z_u)$ is assumed to be a three-dimensional Cartesian system. However, the coordinate system CS can also be a three-dimensional or two-dimensional coordinate system, as noted above.

A position determining system ("PDS") signal antenna assembly 15 in FIG. 1 is rigidly attached to the digital camera 13 and receives a PDS signal from each of a plurality of PDS satellite sources 19A, 19B, 19C, 19D, etc. of the PDS signals and passes the PDS signals to a PDS signal receiver/processor 17 that is preferably also attached to the digital camera 13. Alternatively, the PDS receiver/processor 17 can spaced apart from, be linked to and receive signals from the PDS antenna assembly 15 by a cable link or a wireless link 21L (optional). Optionally, the digital camera 13 includes a rangefinder 16 that determines and records the distance d from the camera lens or other digital image-forming mechanism to a selected object O in the selected view.

The PDS receiver/processor 17 receives the PDS signals from the PDS antenna assembly 15 and determines the location and/or angular orientation of the PDS antenna assembly (or digital camera) and/or time of receipt/observation of the PDS signals, using the times of arrival of the PDS signals from the different PDS satellite signal sources 19A, 19B, 19C, 19D and the known locations of these sources at any given time. The PDS satellite signal sources may belong to a Global Positioning System ("GPS"), to a Global Orbiting Navigational Satellite System ("GLONASS") or to any other suitable geosynchronous or non-geosynchronous satellite system that broadcasts timed signals that can be used to determine location and/or angular orientation and/or time of receipt/observation of a receiver of such signals, such as the Motorola 66-satellite Iridium system or the LEO (Low Earth Orbit) satellite system.

Figure 3:
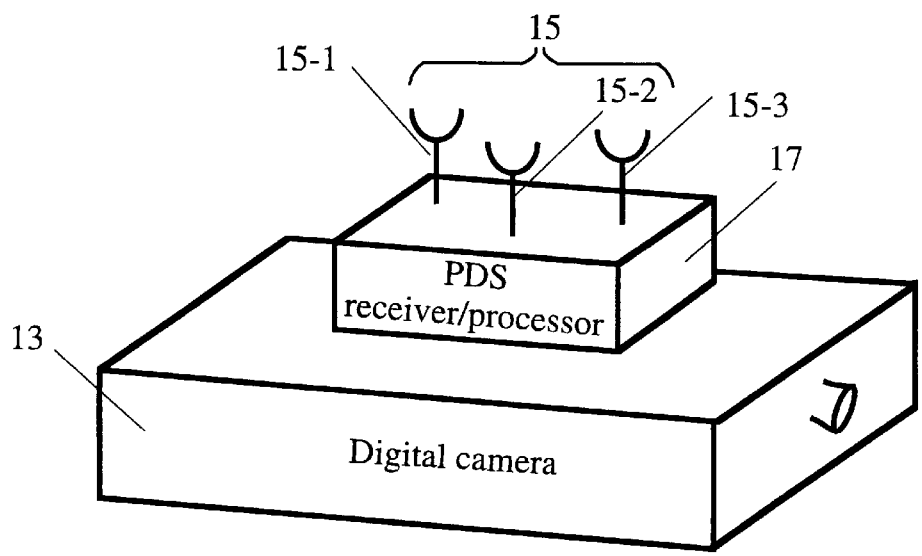
FIG. 3 is a schematic view of placement of three component antennas included in the antenna assembly for angular orientation determination according to one embodiment.

If angular orientation $(\phi, \theta)$ of the digital camera 13 is to be determined, the PDS signal antenna assembly 15 includes three or more spaced apart, non-collinear, PDS signal-receiving component antennas 15-1, 15-2, 15-3, shown in FIG. 3, that define a plane or other two-dimensional surface and whose distances from each other are known and preferably fixed. In this configuration, a PDS signal received at each of the component antennas 15-1, 15-2, 15-3 from a given satellite source, such as 19B, is received by multiplexing at the PDS receiver/processor 17; and the different times of arrival of this PDS signal at the different component antennas determines the angular orientation of a plane or other geometric object containing these component antennas. The PDS component antennas 15-1, 15-2, 15-3 may be rigidly attached to the digital camera 13. Alternatively, one or more of these PDS component antennas 15-2 and/or 15-3 may be snappable into place at fixed angles and at fixed distances relative to another component antenna 15-1, whose location on the digital camera 13 is fixed.

Figure 4:
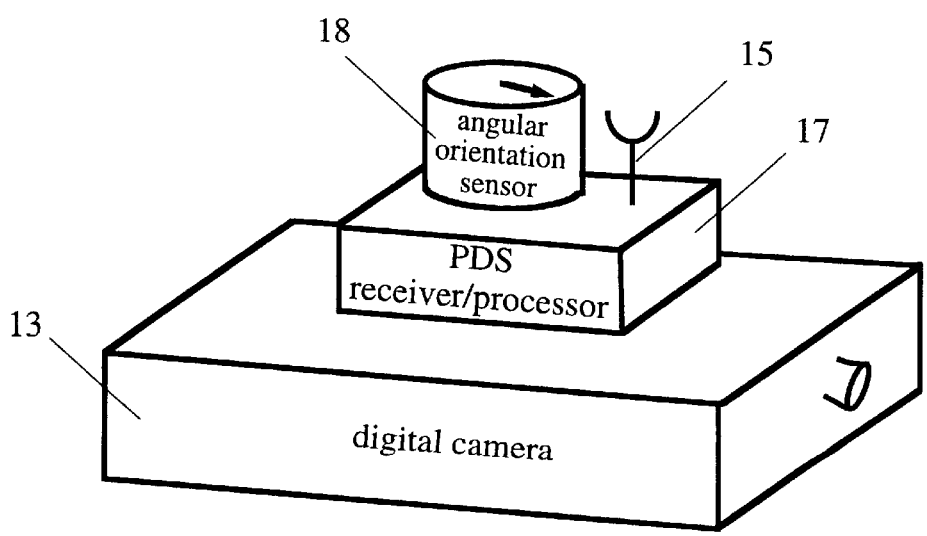
FIG. 4 illustrates determination of angular orientation by a means other than that used in FIG. 3.

Alternatively, where angular orientation $(\phi, \theta)$ of the digital camera 13 is to be determined, this orientation information can be determined using attitude-sensing means other than the three or more location-sensing antennas shown in FIG. 3. Angular orientation or attitude of the digital camera 13 can be sensed by using two or more accelerometers, by using two or more gyroscopes, or by using two or more magnetic field-sensing instruments, referenced to the local direction and/or magnitude of the Earth's magnetic field, as indicated schematically in FIG. 4. Any other accurate attitude or angular orientation sensor 18 that does not rely upon PDS-based determination of the location of a plurality of PDS signal antennas can also be used to determine angular orientation of the digital camera 13.

If angular orientation $(\phi, \theta)$ of the digital camera 13 need not be determined, the PDS signal antenna assembly 15 may include a single antenna, to be used to receive PDS signals at a location that is rigidly attached to the digital camera.

The user 11 points or orients the digital camera 13 and records a digital image of a selected view, as indicated in FIG. 1. At the time this image is recorded, the PDS antenna assembly 15 and PDS receiver/processor 17 receive and analyze PDS signals and determine the present location and/or angular orientation and/or time of receipt/observation of the PDS signals, referred to collectively as "position information" for convenient reference. Optionally, this position information includes the camera-object distance d determined by the rangefinder 16, discussed above.

Figure 5:
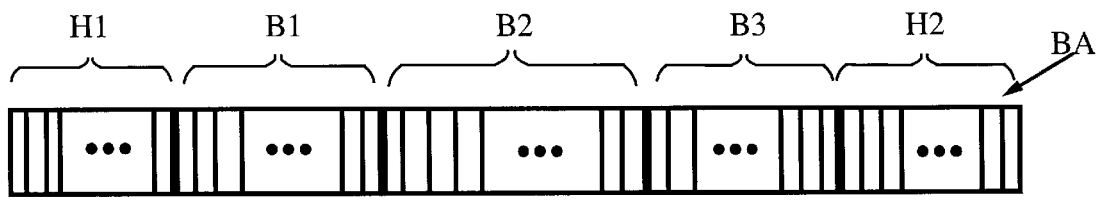
FIG. 5 illustrates one suitable array of bits that provide location, angular orientation and/or time information according to the invention.

In a first embodiment of the invention, the position information is automatically recorded separately at the time the digital image of the selected view is recorded, and the digital image and the position information are associated or bound together for future use. For example, the digital image may be recorded in sub-frame N-1 and the position information may be recorded in a contiguous sub-frame N-2 (of smaller size), which are both parts of frame N. Sub-frame N-2 is illustrated in FIG. 5 as a linear bit array BA of bits, including an optional header having H1 bits, B1 bits containing the location coordinates or related location information for the digital camera, B2 bits containing the angular orientation coordinates or related orientation information for the digital camera, B3 bits containing time of receipt/observation information for the digital camera, and an optional trailer containing H2 bits. The numbers H1, B1, B2, B3 and H1 are nonnegative integers, and least one of the integers B1, B2 and B3 is positive.

In FIG. 5, B1 or B2 or B3 is a positive integer only if the corresponding position information item (location, orientation or time) is recorded and included in the bit array BA. If location information is recorded, for example, each of the two or three location coordinates $x_u$, $y_u$ and/or $z_u$ might be allocated 16 or more bits in the bit array BA to express the corresponding location coordinate in the location coordinate system chosen (Cartesian, polar, cylindrical, spherical, ellipsoidal, etc.) for such representation. If angular orientation information is recorded, each of the one or two angular coordinates $\phi$ and/or $\theta$ might be allocated 16 or more bits in the bit array BA. If time information is recorded, this information might be allocated 16 or more bits in the bit array BA.

In a second embodiment of the invention, the position information is recorded as a visually perceptible overlay on the digital image of the selected view formed by the digital camera 13. This overlay preferably includes the location information and/or the angular orientation information and/or the time information for the PDS signal antenna assembly 15 at the time the digital image is formed. This overlay, illustrated in FIG. 6 as a region designated as "position information," is preferably located near a boundary or other selected site on the digital image that is unlikely to interfere with visual perception of the important details in the digital image of the selected view. This embodiment offers the advantage that the position information is viewable when the digital image is viewed.

Figure 6:
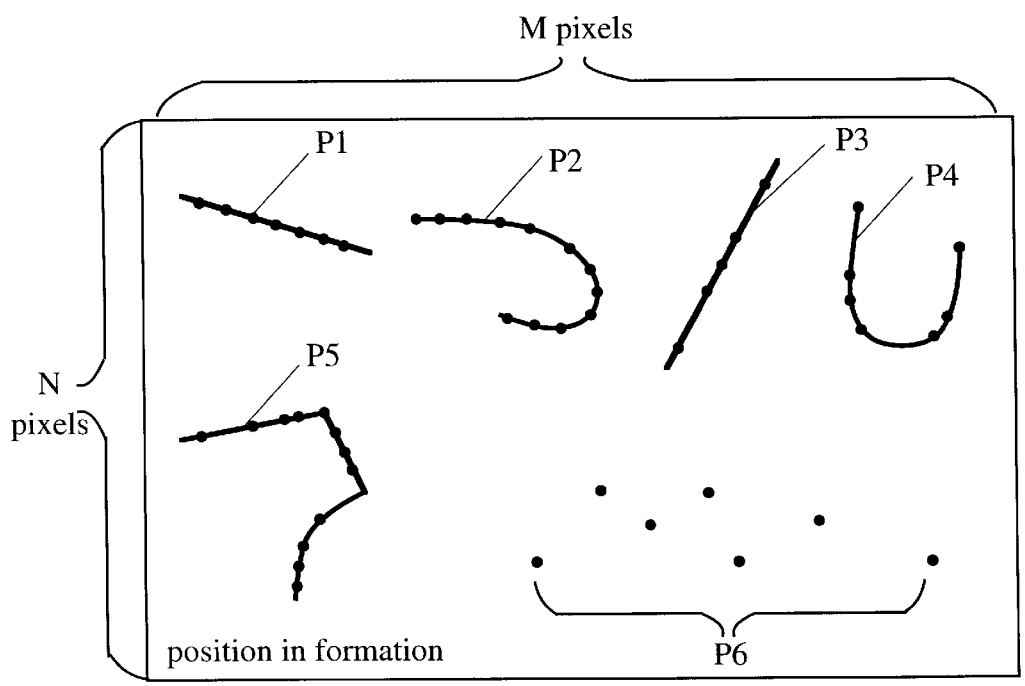
FIG. 6 illustrates several possible pixel patterns that can be chosen for storage of position information to be used for authentication of the digital image, according to one embodiment of the invention.

In a third embodiment of the invention, the position information is automatically recorded or embedded as part of the corresponding digitally expressed image formed by the digital camera, using a pixel array PA such as shown in FIG. 6. An authentication pattern P of pixels, which is a chosen subset CS of pixels in the array PA of all pixels representing the digital image, is selected. For each pixel in the pattern P, one or more bits in the representation of the pixel value is replaced by a bit in the bit array BA, and the original digital image is re-formed as a modified digital image, now containing the position information recorded at the time the original digital image was formed. It is the modified digital image that is stored in the digital camera. The pixel value corresponding to the original digital image may be: (1) a binary value (one bit, black or white, used for text and for line drawings and line graphical images); (2) a gray scale value (J bits with $J \geq 2$, used to represent gray scale images with black, white and up to $2^J-2$ gray scales lying between black and white); (3) color values (J bits with $J \geq 8$, used to represent R,G,B or C,Y,M,K or some other suitable expression of up to $2^J$ colors in a spectrum, including black and white); and (4) any other suitable pixel value representation.

FIG. 6 illustrates several possible authentications patterns P that may be chosen here but is not intended to exhaust the possibilities. Possible patterns include a linear contiguous pattern P1 of pixels, a curvilinear contiguous pattern P2 of pixels, a pattern P3 of non-contiguous pixels located on a line, a geometric pattern P4 of non-contiguous pixels located on a curve, a geometric pattern P5 of non-contiguous pixels located along an open or closed linear or curvilinear polygon, and a randomly selected pattern P6 of pixels.

The authentication pattern P6 may be selected by reference to, or using, the position information recorded with the digital image. As one example of this selection, if the pixels in the digital representation form an M×N array, assign a distinct number $m=0, 1, 2 \ldots, M \cdot N-1$ to each pixel in the pixel array PA. Now express the recorded position information, not as a bit array a shown in FIG. 5, but as a more familiar decimal array of "decimal integers" (each being 0, 1, 2, 3, 4, 5, 6, 7, 8 or 9, a decimal point, or a sign bit±1). In this decimal array, each of the location coordinates $x_u$, $y_u$ and/or $z_u$ is allocated Q+1 decimal integers, each of the angular coordinates $\phi$ and/or $\theta$ is allocated R decimal integers, and the time information is allocated S decimal integers, where Q, R and S are nonnegative integers. Assume that the location coordinates $x_u$, $y_u$ and $z_u$ are expressed as $(\epsilon_x, d_{x,1}, d_{x,2}, d_{x,Q})$ $(\epsilon_y, d_{y,1}, d_{y,2}, d_{y,Q})$ and $(\epsilon_z, d_{z,1}, d_{z,2}, d_{z,Q})$, respectively, where $\epsilon_x$ has the value +1 or −1, corresponding to the sign of the coordinate $x_u$, and each of the quantities $d_{x,n}$ (n=1, 2, ..., Q) is a decimal integer. The pixel pattern P is then chosen as follows. Beginning with the pixel numbered m=m0=0, if $\epsilon_x$=+1, or with the pixel numbered m=m0=1, if $\epsilon_x$=−1, in the pixel array PA, the first Q pixels in the pattern P correspond to the pixel array numbers m0+2$d_{x,1}$, m0+2$d_{x,1}$+2$d_{x,2}$, ... m0+2$d_{x,1}$+2$d_{x,2}$+ ... +2$d_{x,Q}$=m0'. This encodes the location coordinates $x_u$. Beginning with the pixel numbered m1=m0', if $\epsilon_y$=+1, and with the pixel numbered m1=m0'+1, if $\epsilon_y$=−1, the next Q pixels in the pattern P correspond to the pixel array numbers m1+2$d_{y,1}$, m1+2$d_{y,1}$+2$d_{y,2}$, ..., m1+2$d_{y,1}$+2$d_{y,2}$+ ... +2$d_{y,Q}$=m1'. This encodes the location coordinates $y_u$. This selection of pixel locations continues with the Q pixel locations corresponding to the location coordinate $z_u$, the R pixel locations corresponding to the angular coordinate $\phi$, the R pixel locations corresponding to the angular coordinate $\theta$, and the S pixel locations corresponding to the time information.

The set of pixel locations in the authentication pattern P is a maximum of 3Q+2R+S pixels, although fewer pixel locations can be used if desired. This set of (at most) 3Q+2R+S pixel locations can be augmented by additional pixel locations selected using information in addition to the position information. Alternatively, the set of pixel locations in the pattern P used to record the position information can be generated according to some other selection procedure, including purely random pixel selection.

The authentication pattern P should be chosen so that every region $\pi$ of pixels in the array PA with diameter (measured in units of pixel-to-pixel nearest neighbor distance) satisfying dia($\pi$)$\geq$D has at least one pixel from the pattern P in the region $\pi$, where D is a selected value, for example, in the range 5–100. The value D is chosen so that any visually perceptible object of a size at least, say, 0.1–1 cm, when measured on the pixel representation of the digital image, will have at least one pixel from the pattern P. This requires that the density of pixels belonging to the chosen subset CS, within the pixel array PA, be at least equal to a threshold value. One approach for implementing this density requirement is to require that, for any given pixel in the array PA, a circle of diameter D and centered at the given pixel contains at least one pixel in the chosen subset CS.

Alternatively, the pattern P can be a large fraction, such as 50–100 percent, of all the pixels in the array PA, in an interleaved pixel pattern, so that it is substantially impossible to alter the pixel value of two or more contiguous pixels in the digital image without discovery. However, this would require use of a relatively slow procedure to form the modified digital image and use of a relatively slow procedure to analyze and authenticate a putative image of the selected view.

Once the authentication pattern P is selected, one or more bits in the pixel value representation for each pixel in the pattern P is replaced by a bit from the ordered bit array BA (FIG. 5) that represents the position information. In one preferred mode of this second embodiment, the least significant bit ("LSB") of each of the pixel value representations for pixels in the pattern P is replaced by a bit in the bit array BA. Where gray scale or color representations of an image are used with N$\geq$8 bits, change of the LSB from 0 to 1, or from 1 to 0, will not be detectable by most persons so that after such LSB replacement the modified digital image (in visually perceptible form) will be substantially the same as the original digital image.

In a second mode of this third embodiment, two or more bits, or even all bits, in a pixel value representation, for one or more pixels in the authentication pattern P, are replaced by bits from the bit array BA (FIG. 5) of position information. With this last mode implemented, the modified visually perceptible image may be substantially different from the original visually perceptible image and may have a "salt and pepper" visual appearance wherever the number of pixels in the pattern P in a region of the pixel array PA is large.

In the first, second or third embodiment, the position information, shown in bit array format in FIG. 5, can be presented in cleartext or can be encrypted, using an encryption algorithm with a selected encryption key and a corresponding decryption key. The selected encryption key can be prescribed independently of the content of the position information.

Alternatively, the encryption key can depend upon the content of the position information. In this alternative approach, a selected part of, or all of, the position information is treated as one or more parameters that determine the encryption key. For example, the location information and/or angular orientation information and/or time information can be expressed in bit array format and can be combined, bit by bit, with a selected bit pattern of appropriate length L, using EXclusive Or or EXclusive NOR or twos complement addition, to form an encrypted bit array $BA_{enc}$. The encrypted bit array $BA_{enc}$ is then placed in the second sub-frame associated with the digital image in the first sub-frame (first embodiment) or is used to replace selected bits in the pixel value representation for the-pixels in a pixel pattern P, such as shown in FIG. 6.

Figure 7:
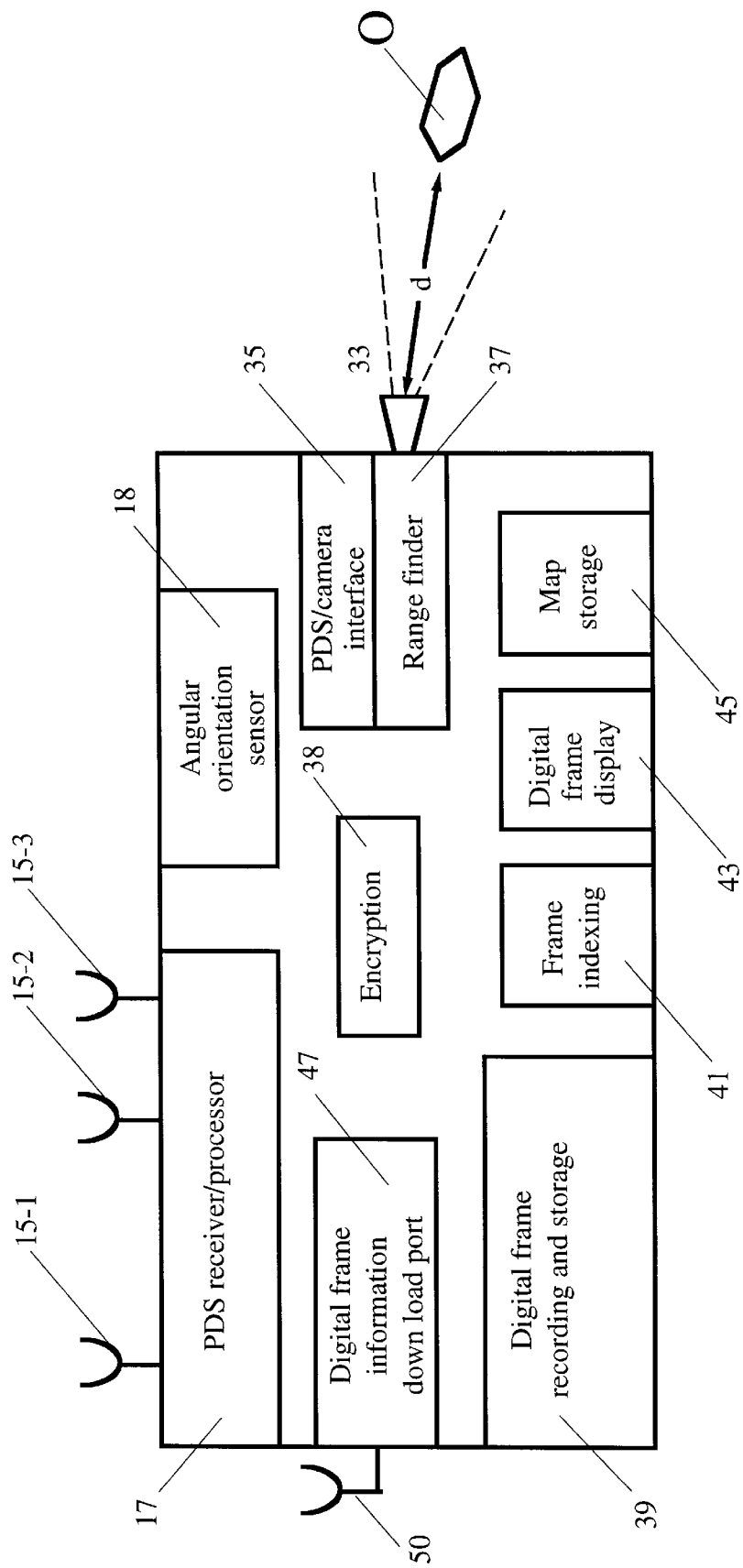
FIG. 7 is a schematic view of one embodiment of the digitized image forming apparatus and PDS signal antenna and receiver/processor apparatus according to the invention.

FIG. 7 schematically illustrates one embodiment of PDS/digital camera apparatus 31 according to the invention. A digitally expressed image of an object O is captured by means of a digital camera lens, focusing and shutter mechanism 33 and is passed through a PDS/camera interface 35. The PDS/camera interface 35 also receives information from a PDS signal receiver/processor 17 that determines position information (location coordinates and/or angular orientation coordinates and/or time of observation of position and/or distance to the object O) based upon PDS signals received at a PDS signal antenna assembly 15. Optionally, the PDS signal antenna assembly 15 may include a single PDS signal antenna 15-1 or may include two or more PDS signal component antennas 15-1, 15-2, 15-3. Optionally, a rangefinder 37, with an optical or electronic signal that can be directed to a selected object O in the selected view, that provides information on the distance d from the digital camera lens mechanism 33 to the object O for analysis and/or digitization by the PDS receiver/processor 17.

Optionally, the apparatus 31 includes an attitude or angular orientation sensor 18 that uses signals that are partly or fully independent of the PDS signals received at any of the PDS antennas 15-1, 15-2, 15-3, such as accelerometer signals, gyroscopic signals or magnetic field signals from the Earth's local field, to determine the angular orientation or attitude of the apparatus 31 at the time a digital image is formed. In this instance, use of a single PDS antenna 15-1 may suffice here.

The PDS/camera interface converts the image of the object O captured by the lens mechanism 33 into an array of K-bit, digitally expressed pixel values, using a CCD (charge coupled device) array or other array of M$\times$N optical sensors, with each pixel or cell corresponding to a pixel or picture element for the digital image. The number of bits K for each pixel value may be K$\geq$1 for text or simple line drawings, K$\geq$8 for gray scale images, and K $\geq$16 (preferably K$\geq$32) for color images. Where a color image is captured and digitally expressed by the lens mechanism 33, 8 bits may be used for expressing image intensity and K-8 bits may be used to express the color hue and/or color saturation data for the image. The pixel array size may be M$\times$N =100$\times$133, 480$\times$640, 480$\times$720, or some smaller or larger size.

The digitally expressed image for the object O is combined or paired with the digitally expressed position information received from the PDS receiver/processor 17 at the PDS/camera interface 35 and is passed through an encryption module 38 (optional) to a digital frame recording and storage module 39 for "permanent" storage therein as a digital frame or file. As noted above, the digital image and the corresponding digitized position information may be stored as two subframes that are part of the same digital frame, or the position information may be stored as part of the digital image, with one or more altered pixel value bits that contain position information. Optionally, a sequence of two or more digital frames, such as a digital video sequence, may be thus formed, recorded and stored in the frame recording and storage module 39. A digital frame is optionally assigned a corresponding index number, unique for each frame, and this index number is stored in an indexing module 41 with an adjustable pointer that indicates which digital frame in the frame recording and storage module 39 corresponds to this index number. Optionally, the indexing module 41 allows specification of which portion of the digital frame is to be displayed (or downloaded through a download port 45, discussed below) and the format to be used for such display.

If information on one or more digital frames stored in the frame recording and storage module 39 is to be visually or audibly displayed (optional), the index number(s) corresponding to the digital frame(s) is specified at the indexing module 41. A copy of a specified digital frame, or portion thereof, is sent to a digital frame display or playback module 43, for viewing of the digitally expressed image(s). of the object O and/or of the corresponding position information in graphical or alphanumeric format. The format for display of the position information contained in a digital frame may be in terms of latitude, longitude, elevation, orientation angle (s), observation time and/or lens-to-object distance. Alternatively, the location coordinate information contained in a digital frame may be expressed in terms of local coordinates or in terms of another global coordinate system. Optionally, a visually perceptible map with an adjustable scale, drawn from a collection of maps stored in a map storage module 45, may be provided at the digital frame display module 43 that graphically indicates by an icon the location of the apparatus 31 at the time a specified digital frame was formed.

Part or all of the information contained in a digital frame stored in the frame recording and storage module 39 may be downloaded, using a digital frame information download port 47, and/or transmitted, using an optional transmitter and antenna 50, that are connected to the module 39. Downloading or transmission of this information is, optionally, performed by an authorized digital frame downloader who uses an optional special software key (e.g., a confidential or encryption key) or an optional special hardware key to request and implement the frame information download.

The digital image and the associated position information are downloaded directly from the digital frame recording and storage module 39, possibly using a portion of or all of the position information to provide a key for decryption and/or to provide a key for determining the pattern P of pixels used to hold the position information. Authentication of the image is provided by comparing the position information contained in the digital frame with the putative position information that is asserted or is on file elsewhere. If the downloaded or displayed position information and the putative position information substantially agree, the corresponding digital image on that frame may be authenticated. If the downloaded or displayed position information and the putative position information do not substantially agree, authentication of the corresponding digital image on that frame may be withheld.

The digital camera 33 may use an array of charge coupled devices ("CCDs"), magnetic tape recording or other suitable devices and media to record the digital images. Various approaches for digital recording of an image in a digital still camera or a digital video camera are discussed in U.S. Pat. Nos. 4,074,324, issued to Barrett, No. 4,131,919, issued to Lloyd et al, No. 4,489,351, issued to de Costemore d'Arc, No. 4,541,010, issued to Alston, No. 4,626,898, issued to Baba et al, No. 4,680,628, issued to Wojcik et al, No. 4,702,585, issued to Harada et al, No. 4,704,632, issued to Van Den Heuvel, and No. 4,837,628, issued to Sasaki. The information in these patents is incorporated by reference herein.

One method of recording the digital frame uses a three-state, Read Only Memory (ROM) chip. The ROM chip has a plurality of activatable sites, each with an initial, pristine state and distinct, first and second activated or burned-in states. When a digital image is formed by the digital camera, the initial, pristine state at each site is converted into a first activated state or into a second activated state, after which no further state change is possible. Alternatively, a two-state ROM chip may be used here.

The digital frame thus formed may, optionally, be protected by locking down the frame so that the frame can be visually or audibly perceived using the digital frame display 43 but cannot be downloaded except by use of a confidential key that is held by a certified digital image downloader. Alternatively, this confidential key may be decomposed into two or more key components, and each component may be held by a separate certified digital frame downloader.

Figure 8:
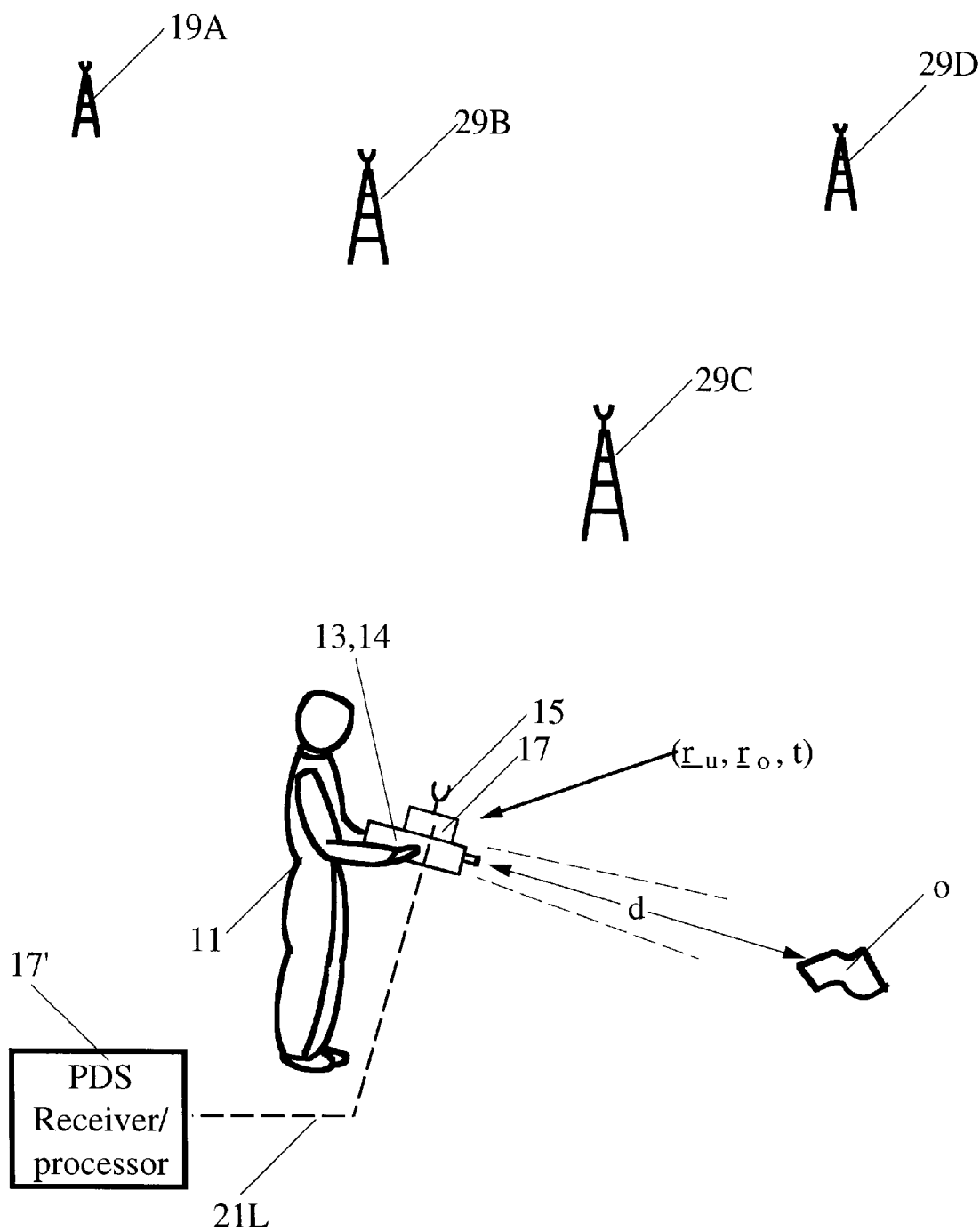

Alternatively, the PDS signal antenna assembly 15 and PDS signal receiver/processor 17 can receive PDS signals from ground-based PDS signal sources, such as signal towers or other substantially stationary sources 29A, 29B, 29C, 29D in a Loran-C, Tacan, Decca, Omega or Metricom system, as illustrated in FIG. 8.

Assume that the pixels in the pixel array PA are numbered n=1, 2, . . . , N and that the pixels in the chosen subset CS used for image authentication correspond to n=n1, n2, n3, . . . , nA, where A is a positive integer less than N. List the set PN of prime numbers (not divisible by any integer greater than 1 that is less than the number itself) in increasing order as p(1)=2, p(2) =3, p(3)=5, p(4)=7, p(5)=11, etc. up to n=N. For example, p(25)=97 and p(168)=997. According to a theorem of Euler the number of prime numbers is infinite so that for any integer N one can, in principle, find the prime number p(N). The number of prime numbers no greater than M is known to be approximately equal to $M/\log_{10}(M)$ so that the Nth prime number p(N) increases quickly with the integer N.

Now define a sequence of numbers $$q(m) = 1 \quad \text{if pixel } m \text{ does not belong to } CS \quad (1)$$
$$= p(m) \quad \text{if pixel } m \text{ belongs to } CS,$$

and define an authentication indicium Q by $$Q = \prod_{m=1}^{N} q(m). \quad (2)$$

The number Q has A prime number divisors, corresponding to the A numbers n=n1, n2, . . . , nA in the chosen subset CS, and for any chosen subset CS of A pixels ($1 \leq A < N$) a corresponding number Q, defined by Eq. (1), can be found. The correspondence between Q and the particular pixels in the chosen subset CS is thus one-to-one. The set of pixel locations in the chosen subset CS is thus prescribed uniquely by the single number Q. Thus, one can transmit a frame, consisting of the image to be authenticated and position information for the digital image formation means plus the number Q and thereby fully specify the image and its authentication pixel pattern CS. The set PN of prime numbers can be replaced by any other countable, infinite set S of distinct numbers (real or complex) $\{z_n\}$n for which, given any (real or complex) number z in a selected group, a unique factorization of z into multiplicative factors drawn from S exists.

Note that the authentication indicium Q in this approach does not contain the position information itself; Q merely determines the locations in the pixel array PA at which the pixel bit values have been modified to contain the position information. Specification of the indicium Q allows a user to (1) identify the locations of the chosen subset CS of pixels in the pixel array PA at which the pixel bit values have been modified to contain the position information, (2) retrieve the pixel values for the chosen subset CS of pixels, and (3) retrieve the position information contained in the modified pixel bit values in the chosen subset CS of pixels.

If each pixel in the pixel array PA has an associated pixel value that is expressed as an ordered set of K pixel bits (K=1, 8, 16 or 24, for example), this first approach can be extended by first numbering all pixel bits m=1, 2, ..., K·N, where K is the number of bits in a pixel value. Define CS' to be the set of integers, drawn from the set {1, 2, ... K·N}, corresponding to pixel bits that are modified to contain the position information. Now define $$q'(m) = 1 \quad \text{if bit } m \text{ does not belong to } CS' \quad (3)$$
$$= p(m) \quad \text{if bit } m \text{ belongs to } CS'.$$

Finally, define an authentication indicium Q' by the product $$Q' = \prod_{m=1}^{K \cdot N} q'(m). \quad (4)$$

The authentication indicium Q' plays the same role in this second approach that the indicium Q plays in the first approach, except that Q' now identifies the particular pixel bits whose values are modified to contain the position information.

In a third approach, an indicium can be defined using sums rather than products of numbers. Define another sequence of numbers $$r(m) = 0 \text{ if pixel } m \text{ does not belong to } CS \quad (5)$$
$$= 1 \text{ if pixel } m \text{ belongs to } CS,$$

and define an authentication indicium R by $$R = \sum_{m=1}^{N} r(m) 2^{-m}. \quad (6)$$

The maximum value of R is $1-2^{-N} (\leq 1)$, and each pixel that is a member of the chosen subset CS makes a unique, measurable contribution to the indicium R. More specifically, the indicium R in Eq. (6) may be re-expressed in binary form as (r(1), r(2), r(3), ..., r(N)), where a coefficient r(m)=1 if and only if pixel m belongs to the chosen subset CS. Any number of the form $w/2^N$ (w=0, 1, 2, 3, ..., $2^N-1$) can be re-expressed in the form of Eq. (6) and thus corresponds to a particular choice of pixel locations in the chosen subset CS.

More generally, for any choice of a real number Z>1 an authentication indicium $$R(Z) = \sum_{m=1}^{K \cdot N} r(m) Z^{-m} \quad (7)$$

can be defined in which each pixel that is a member of the chosen subset CS makes a unique, measurable contribution to the indicium R(Z). By analogy with the re-expression of Eq. (6) in binary form, Eq. (7) can be re-expressed in Z-ary form as (r(1), r(2), r(3), ..., r(N)), in which the kth element r(k) (k=1, ..., N) in this sequence has an associated weight of $Z^{-k}$. The maximum value of the indicium R(Z) is $\{1-Z^{-N}\}/(Z-1)$.

By analogy with the development of Eqs. (3) and (4), if each pixel in the pixel array PA has an associated pixel value that is expressed as an ordered set of M pixel bits (M=8, 16 or 24, for example), this first approach can be extended by first numbering all pixel bits n=1, 2, ..., K·N. Define CS' to be the set of integers, drawn from the set {1, 2, ... K·N }, corresponding to pixel bits that are modified to contain the position information. In a fourth approach, define $$r'(m) = 0 \text{ if bit } m \text{ belongs to } CS' \quad (8)$$
$$= 1 \text{ if bit } m \text{ belongs to } CS',$$

and define an authentication indicium R' by the product $$R'(Z) = \sum_{m=1}^{K \cdot N} r'(m) Z^{-m} \quad (9)$$

The authentication indicium R'(Z) plays the same role in this fourth approach that the indicium or R(Z) plays in the third approach, except that R'(Z) now identifies the particular pixel bits whose values are modified to contain the position information.

If the number K·N of pixels in the pixel array PA is large, the number Q or Q', as defined in Eq. (2) or (4) will be very large; and the number of Z-ary digits required for the Z-ary expression (r(1), r(2), r(3), ..., r(N)) or (r(1), r(2), r(3), ..., r(K·N)) will also be very large. One method of reducing a number such as Q or Q' or N or K·N to manageable size is to decompose the pixel array PA into a plurality of smaller, preferably non-overlapping sub-regions of similar or identical shape and size and to apply the analysis indicated in Eqs. (1) and (2), in Eqs. (3) and (4), in Eqs. (5) and (6), or in Eqs. (8) and (9), to each sub-region separately. This approach is also useful in limiting, if not eliminating, the amount of image alteration that can go undetected.

The pixel array PA can be tesselated by a numbered set of convex, regular, identical polygons (all sides having the same length, with vertices lying on a single circle) that cover the pixel array PA, using equilateral triangles, squares or regular hexagons. To this list of convex, regular polygons one can add isoceles triangles, rectangles, parallelograms and non-equilateral hexagons (having sides with the same length but not having identical interior angles) to obtain a numbered set TP of two-dimensional tesselation polygons, to each of which the analysis indicated in Eqs. (1) and (2), in Eqs. (3) and (4), in Eqs. (5) and (6), or in Eqs. (8) and (9) is applied, covering the pixel array PA, as a polygon overlay in which each pixel lies in precisely one polygon of the overlay. These seven classes of polygons are illustrated in FIGS. 9A, 9B, 9C, 9D, 9E, 9F and 9G, respectively.

Figure 9A:
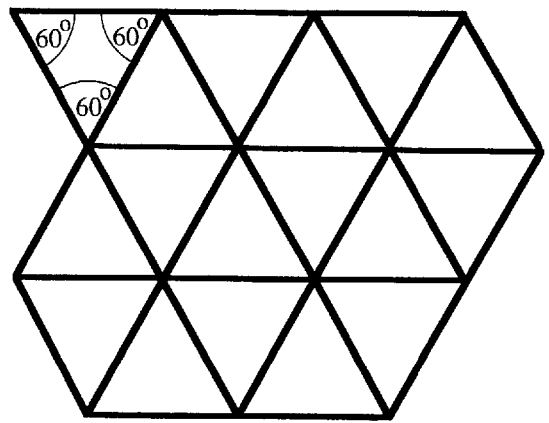
FIGS. 9A, 9B, 9C, 9D, 9E, 9F and 9G illustrate some suitable polygon coverings or overlays for the pixel array.
Figure 9B:
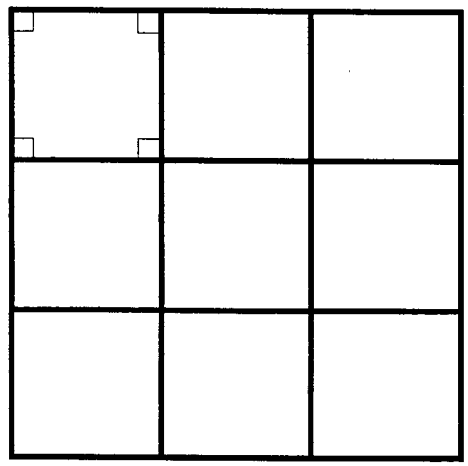
Figure 9C:
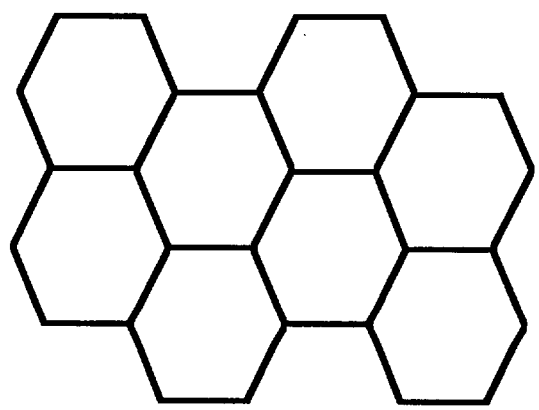
Figure 9E:
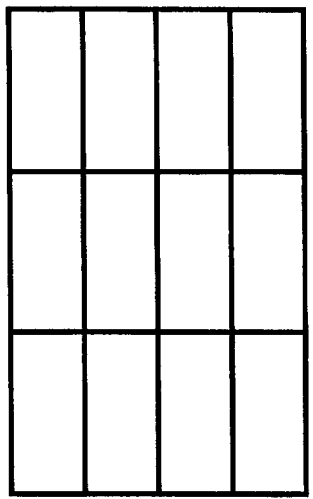

For purposes of illustration, consider a tesselation of a pixel array PA by a numbered assembly TP of convex, regular hexagons $h_g$ (g=1, 2, ..., G), as indicated in FIG. 9C. A hexagon that is located near an edge of the pixel array PA may contain fewer pixel locations than a hexagon that is located in the interior of the pixel array PA, but the analysis is the same.

Figure 10:
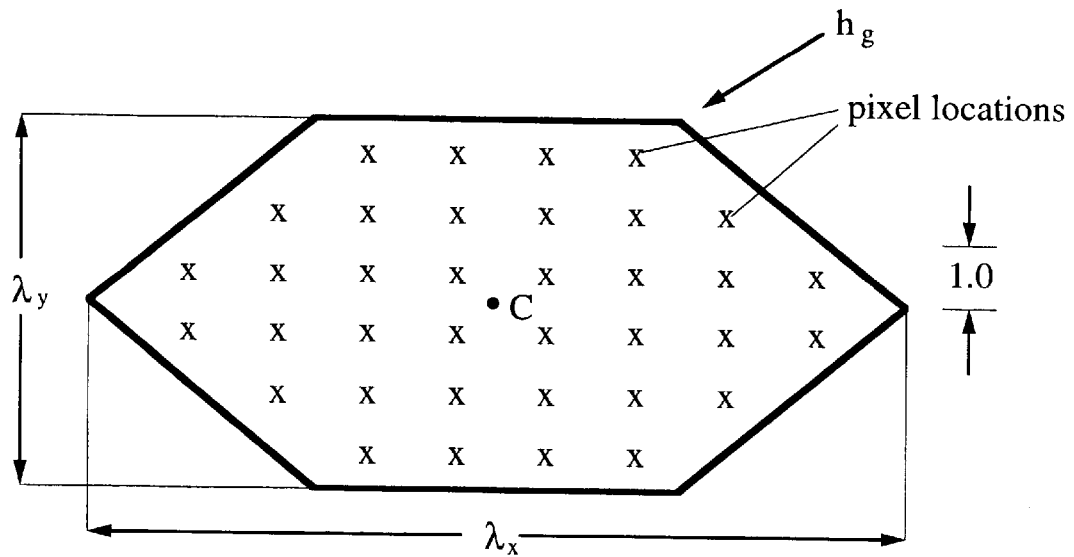
FIG. 10 illustrates use of a regular hexagon for image authentication pattern analysis.

A representative regular hexagon h, shown in FIG. 10, has a top-to-bottom width of $\lambda_y$, a vertex-to-vertex length of $\lambda_x = (2/\sqrt{3})\lambda_y (>\lambda_y)$, and an area of $(\sqrt{3}/2)(\lambda_y)^2$, with the hexagon orientation shown in FIG. 10. For example, if $\lambda_y=6$, $\lambda_x=4\sqrt{3} \approx 6.928$, and the corresponding hexagon area is $A_{hex}=31.177$. For this particular hexagon, six horizontal pixel lines, spaced 1.0 units apart, with each horizontal line containing pixels at intervals of 1.0 unit as shown, are set down within the hexagon at line "heights" of $\Delta y=\pm 0.5$ units, $\pm 1.5$ units and $\pm 2.5$ units relative to the center C of the hexagon. The hexagon h contains an average $m_{hex}$ of 31–32 pixel locations, the maximum distance $d_{hex}$ from the center C to a pixel location within h is $$d_{hex} \approx \sqrt{8.5} \approx 2.915, \quad (10)$$

and the diameter $D_{hex}$ of this hexagon is $$D_{hex} = \lambda_x = 6.928. \quad (11)$$

More generally, for a regular hexagon of width $\lambda_y$ and length $\lambda_x=(2/\sqrt{3})\lambda_y$, and a general choice of locations of horizontal lines spaced 1.0 units apart, the maximum distance of a pixel from the center C, the hexagon diameter and the hexagon area are given by $$d_{hex} \leq \lambda_y/\sqrt{3}, \tag{12}$$

$$D_{hex} = 2\lambda_y/\sqrt{3}, \tag{13}$$

$$A_{hex} = 6(\lambda_x/4)(\lambda_y/2) = \sqrt{3}(\lambda_y)^2. \tag{14}$$

The distances $d_{hex}$ and $D_{hex}$ and area $A_{hex}$ scale linearly, linearly and quadratically, respectively, with the choice of $\lambda_y$. The number $m_{hex}$ of pixel locations within the hexagon h scales monotonically but nonlinearly with the choice of $\lambda_y$.

Preferably, the pixel locations in the array PA are uniformly spaced apart and the hexagons are positioned so that each pixel location is in one hexagon and is not located on a boundary of any hexagon. The pixel locations within a hexagon $h_g$ (numbered g=1, 2, ..., G) are numbered m=1, 2, ..., $m_{hex}$. At least one pixel in the chosen set CS is selected in each hexagon $h_g$, and the distance D of any pixel within such a hexagon from a pixel in the chosen set CS within that hexagon is easily verified to be $$D \leq 2d_{hex} \approx 5.821, \tag{15}$$

for the choices $\lambda_x = 4\sqrt{3}$ and $\lambda_y = 6$. As noted, the distance D is proportional to the distance $d_{hex}$ and thus scales linearly with $\lambda_y$. If, for example, it is desired that the maximum distance of any pixel from the nearest pixel in the chosen set CS satisfy $D \leq 5$ (in units of pixel-to-pixel nearest neighbor distance), a new array of identical hexagons is selected. The vertex-to-vertex length $\lambda_x$ and the top-to-bottom width $\lambda_y$ are chosen as $$\lambda_y \leq (5/5.831)6 \approx 5.164, \tag{16}$$

$$\lambda_x = (2/\sqrt{3})\lambda_y \approx 5.962. \tag{17}$$

for each new hexagon in the new array. This new array satisfies $D \leq 5$.

The hexagons in the array are assigned numbers $h_g$ with g=1, 2, ..., G, and each pixel within the hexagon $h_g$ is assigned a number m=1, 2, ... $m_{hex,g}$, where $m_{hex,g}$ is the number, discussed above, of pixels within the hexagon $h_g$. The number $m_{hex,g}$ may be constant or may vary slightly from one hexagon to the next, depending on the size, location and orientation of each hexagon relative to the pixel array PA. Within each hexagon $h_g$, a sub-indicium $I_g=Q_g$ or $I_g=Q'_g$ or $I_g=R(Z)_g$ or $I_g=R'(Z)_g$ (written as "$I_g$" for convenient reference) for members of the chosen subset CS that are within the hexagon $h_g$ (denoted "CSg") is calculated, and the hexagon $h_g$ is assigned the indicium component (g, $I_g$). For example, if the selected sub-indicium is $I_g=Q_g$ or $I_g=R(Z)_g$, $I_g$ is calculated using the respective definitions $$q(m)_g = 1 \text{ if pixel } m \text{ does not belong to } CS_g \tag{18}$$

$$= p(m) \text{ if pixel } m \text{ belongs to } CS_g,$$

$$Q_g = \prod_{m=1}^{N} q(m)_g, \tag{19}$$

$$r(m)_g = 0 \text{ if pixel } m \text{ does not belong to } CS_g \tag{20}$$

$$= 1 \text{ if pixel } m \text{ belongs to } CS_g,$$

$$R(Z) = \sum_{m=1}^{N} r(m)_g Z^{-m}. \tag{21}$$

The position of each hexagon $h_g$ is assumed to be known, relative to the pixel array PA. The pixel array PA is then assigned an authentication indicium I, such as $$I = (1, I_1; 2, I_2; \ldots ; G, I_G), \tag{22}$$

which characterizes the chosen subset CS for the regular hexagon array shown in FIG. 9C.

Figure 9G:
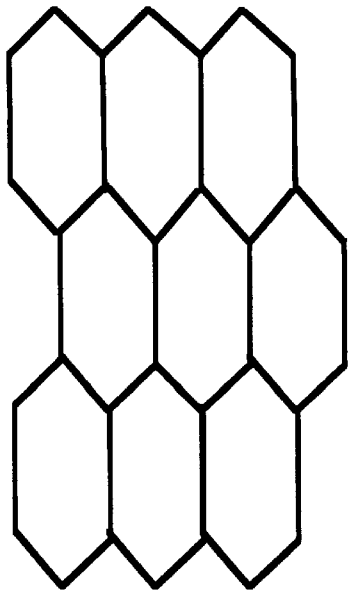
Figure 11:
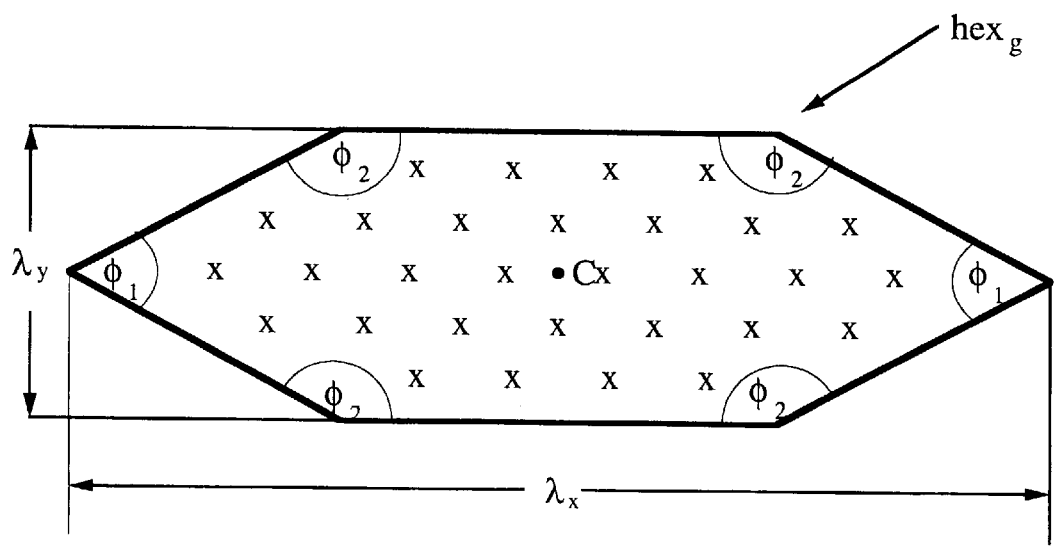
FIG. 11 illustrates use of a non-equilateral hexagon for image authentication pattern analysis.

A hexagon $hex_g$, shown in FIG. 11, from the array of non-equilateral hexagons in FIG. 9G with fixed interior angles 100 1(<120°) and $\phi 2(>120°)$, is similarly analyzed, and the corresponding vertex-to-vertex length $\lambda'_x$ and top-to-bottom width $\lambda'_y$ are determined. If each side of the hexagon $hex_g$ has length s, the parameters $\lambda'_x$ and $\lambda'_y$ are determined by the relations $$\lambda'_x = s(1 - 2\cos\phi 2), \tag{23}$$

$$\lambda'_y = 2s\cos(\phi/2) \tag{24}$$

where the interior angles $\phi 1$ and $\phi 2$ are fixed. The corresponding maximum distance $d'_{hex,g}$ from the hexagon center C to any pixel location within the hexagon $hex_g$, the diameter $D'_{hex,g}$ of the hexagon $hex_g$, and the area $A_{hex,g}$ of the hexagon $hex_g$ scale linearly, linearly and quadratically, respectively, with the choice of value for the parameter $\lambda'_x$ or $\lambda'_y$ or s for that hexagon. The number $m'_{hex,g}$ of pixel locations in the array PA that lie within the hexagon $hex_g$ will increase monotonically but nonlinearly with the parameter $\lambda'_x$ or $\lambda'_y$ or s for that hexagon. The collection of hexagons $hex_g$ that cover the array PA of pixels is then numbered g=1, 2, ..., G, a sub-indicium $I_g$ is then calculated for each hexagon $hex_g$ as discussed above, and the pixel array PA is assigned an authentication indicium $$I = (1, I_1; 2, I_2; \ldots ; G, I_G) \tag{25}$$

characterizing the chosen subset CS.

Figure 12:
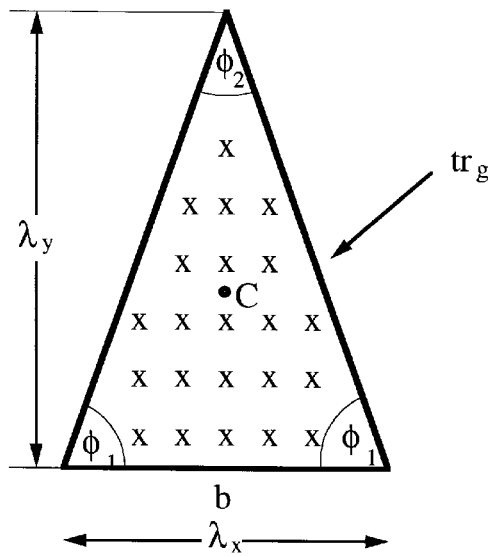
FIG. 12 illustrates use of an isoceles triangle for image authentication pattern analysis.

Proceeding by analogy, an isoceles (or equilateral) triangle $tr_g$ with interior angles $\phi 1$, $\phi 1$ and $\phi 2$ (which may all be=60°) and base length b (in units of nearest neighbor pixel-to-pixel distance), shown in FIG. 12, has a center C and has a length $\lambda_x=b$ and a width $\lambda_y=0.5 b \tan\phi 1$ in the x-direction and in the y-direction, respectively. For any set of horizontal lines containing pixel locations imposed on the triangle $tr_g$, the maximum distance $d_{tr,g}$ from the center C to any pixel location within this triangle is the distance of the center C to any vertex and is given by $$d_{tr,g} = 0.25 b \sec\phi 1 \csc\phi 1 \tag{26}$$

Figure 9D:
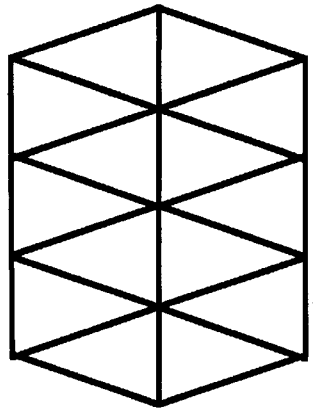
Figure 9F:
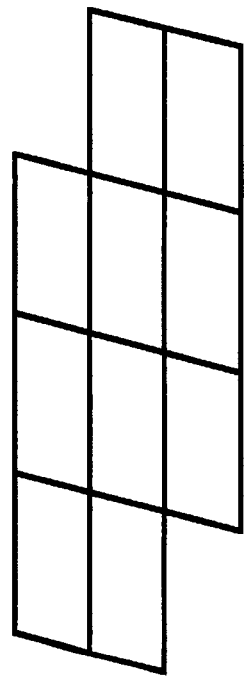

Assume that each triangle, such as $tr_g$, in the array shown in FIG. 9A or 9D contains at least one pixel from the chosen subset CS. The maximum distance $D_{tr,g}$ from any pixel location in the triangle $tr_g$ to a pixel location in the chosen subset CS within $tr_g$ is then bounded by $$D_{tr,g} \leq 2d_{tr,g} = 0.5b \sec\phi 1 \csc\phi 1, \tag{27}$$

and this upper bound on the distance $D_{tr,g}$ can be raised or lowered by varying the base length b. The pixel locations within the triangle $tr_g$ are consecutively numbered m=1, 2, ..., $m_{tr,g}$, and the sub-indicium $I_g$ is calculated for each triangle $tr_g$. An authentication indicium $$I = (1, I_1; 2, I_2; \ldots ; G, I_G) \tag{28}$$

is associated with the array of triangles $tr_g$ for the pixel array PA, characterizing the chosen subset CS.

Figure 13:
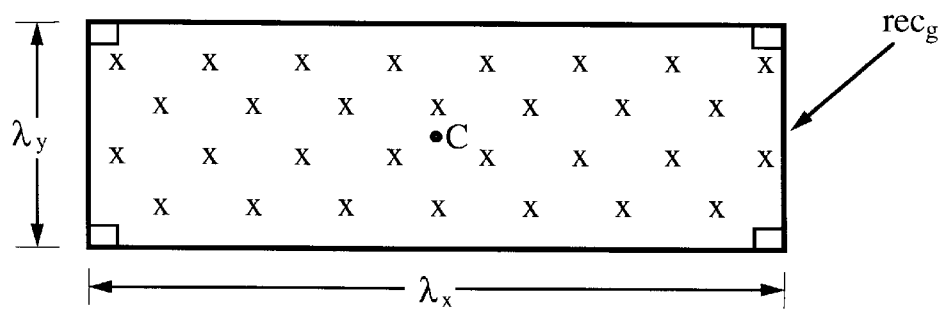
FIG. 13 illustrates use of a rectangle for image authentication pattern analysis.

Proceeding by analogy, a rectangle (which may be a square) $rec_g$ has length $\lambda_x$ and width $\lambda_y$ in the x-direction and in the y-direction, respectively, where the ratio $r = \lambda_y/\lambda_x$ is assumed to be fixed, is shown in FIG. 13. The maximum distance from the rectangle center C to any pixel location within the rectangle $rec_g$ is given by $$d_{rec,g}=0.5[1+r^2]^{1/2}\lambda_x, \quad (29)$$

and the maximum distance $D_{rec,g}$ from any pixel location in the rectangle $rec_g$, to a pixel location in the chosen subset CS within $rec_g$ is then bounded by $$D_{rec,g} \leq 2d_{rec,g}=[1+r^2]^{1/2}\lambda_x. \quad (30)$$

This upper bound can be raised or lowered by varying the length $\lambda_x$. The pixel locations within the rectangle $rec_g$ are consecutively numbered m=1, 2, . . . , $m_{rec,g}$, and the sub-indicium $I_g$ is calculated for each rectangle $rec_g$. An authentication indicium $$I=(1, I_1; 2, I_2; \ldots ; G, I_G) \quad (31)$$

is associated with the array of rectangles $rec_g$ for the pixel array PA, characterizing the chosen subset CS.

Figure 14:
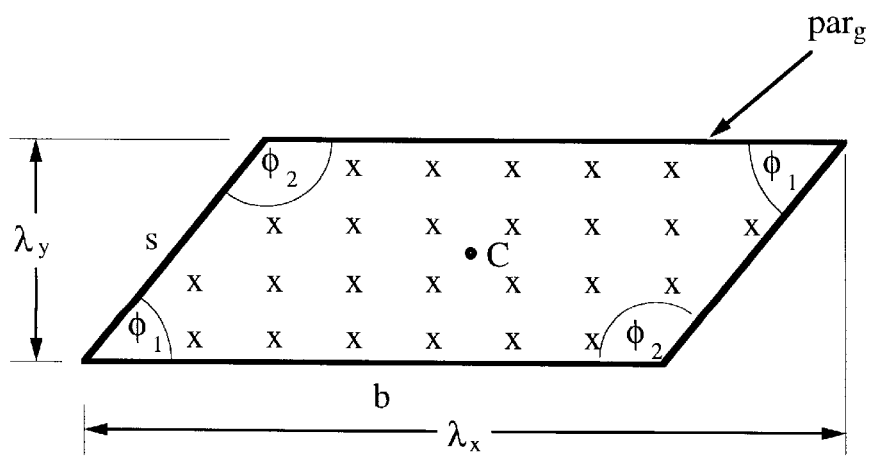
FIG. 14 illustrates use of a parallelogram for image authentication pattern analysis.

Proceeding by analogy, a parallelogram $par_g$ with fixed interior angles $\phi1(<90°)$ and $\phi2=180°-\phi1$, with base b, overall length $\lambda_x$, slant height s and width $\lambda_y$, is illustrated in FIG. 14, where the ratio r=s/b is fixed. The maximum distance from the parallelogram center C to any pixel location within the parallelogram $par_g$ is given by $$d_{par,g}=0.5[(1+r\cos\phi1)^2+(r\sin\phi1)^2]^{1/2}b. \quad (32)$$

and the maximum distance $D_{rec,g}$ from any pixel location in the parallelogram $par_g$, to a pixel location in the chosen subset CS within $par_g$ is then bounded by $$D_{par,g} \leq 2d_{par,g}=[(1+r\cos\phi1)^2+(r\sin\phi1)^2]^{1/2}b. \quad (33)$$

This upper bound can be raised or lowered by varying the length $\lambda_x$. The pixel locations within the parallelogram $par_g$ are consecutively numbered m =1, 2, . . . , $m_{par,g}$, and the sub-indicium $I_g$ is calculated for each parallelogram $par_g$. An authentication indicium $$I=(1,I_1;2,I_2; \ldots ; G, I_G) \quad (34)$$

is associated with the array of parallelograms for the pixel array PA, characterizing the chosen subset CS.

The preceding development may be applied to any suitable polygon used as the basis for a set of tesselation polygons TP. The pixel locations may be aligned in a square pattern, as shown in FIGS. 10, 12 and 14, or may be staggered in a diamond pattern, as shown in FIGS. 11 and 13.

The preceding formalism allows the pixel array PA to be covered by an array of polygons of identical shape and size, allows a sub-indicium $I_g$ to be calculated for each of these polygons, and allows an authentication indicium I to be associated with the polygon array for the pixel array PA and the chosen subset CS. This formalism also allows the distance from any pixel location in the pixel array PA to a nearest neighbor pixel location in the chosen subset CS to be bounded above, by a calculable value $d_{max}$ that is proportional to the choice of a single geometric parameter, such as $\lambda_x$ or $\lambda_y$. This upper bound $d_{max}$ can be varied to insure that no pixel in the pixel array PA is more than, say, D=5 pixel-to-pixel units from at least one pixel in the chosen subset CS. With this choice of P, an alteration of the image that is at least P units in width will be detected by the invention. If the nearest neighbor pixel-to-pixel distance is 0.4 mm, for example, this choice of D=5 would detect an image alteration having a width of at least 2 mm. For most purposes, a choice of D in the range 4–100 will provide adequate detection of image alteration. The limit on image alteration width can be raised or lowered by changing the geometric parameter, such as $\lambda_x$ or $\lambda_y$, that determines the size of each of the polygons used for the covering array.

We claim:

1. Apparatus for producing a self-authenticating image, the apparatus comprising:

a digital image camera, including a digital image-forming lens that forms a digitally expressed image ("digital image") of a selected view as an array of pixel values, with each pixel value corresponding to a pixel in an array of pixels;

a position determination mechanism, including a digital computer, for determining position information that includes at least one of the location of the digital camera, the angular orientation of the digital camera, the time a digital image is formed, and an estimated distance from a selected object to the digital image camera, at the time the digital image camera forms a digitally image;

digital image storage means for receiving a digital image from the digital image camera, for receiving the position information from the position determination mechanism, for combining the digital image with the position information to form a modified digital image in which each pixel value in a chosen subset CS of the array of pixels is reformed as a modified pixel value to contain a portion of the position information, for storing the modified array of pixel values, and for providing an authentication indicium that indicates the chosen subset CS of the modified array of pixels; and an authentication mechanism, connected to the digital image storage means, for receiving putative position information for a selected digital image, for using the authentication indicium to retrieve the position information from the digital image storage mechanism, for comparing the putative position information with the retrieved position information, and for taking at least one of the following actions: (i) withholding authentication of the selected digital image if the putative position information does not substantially agree with the retrieved position information and (ii) authenticating the selected digital image if the putative position information substantially agrees with the retrieved position information.

2. The apparatus of claim 1, further comprising display means, connected to said digital image storage means, for providing information contained in a modified digital image in at least one of electronically perceptible form, visually perceptible form and audibly perceptible form.

3. The apparatus of claim 1, wherein said position determination mechanism comprises:

a Satellite Positioning System ("SATPS") signal antenna that receives SATPS signals transmitted from at least three SATPS signal sources; and an SATPS signal receiver/processor to receive and process SATPS signals from the SATPS antenna and to determine at least one of (ii) the location of the SATPS antenna and (ii) a time of receipt of at least one SATPS signal.

4. The apparatus of claim 3, further comprising angular orientation determination mechanism, attached to said digital camera, for determining the angular orientation of said digital camera at least partly independently of said SATPS signals received from said SATPS signal sources.

5. The apparatus of claim 3, wherein said position determination mechanism further comprises:

at least three SATPS signal antennas, arranged non-collinearly to each receive SATPS signals transmitted from said at least three SATPS signal sources; and an SATPS signal receiver/processor to receive and process SATPS signals from the SATPS antennas and to determine the location of each of the SATPS antennas and the angular orientation of a plane containing the at least three SATPS antennas and of a selected line lying in this plane, where this selected line has a known angular orientation relative to said digital camera.

6. The apparatus of claim 1, wherein:
(1) said pixel locations in said array of pixel values are numbered m=1, 2, ..., N;
(2) said pixel location number m is assigned a unique prime number p(m) in a sequence of distinct prime numbers;
(3) said pixel location number m is assigned a number q(m)=p(m) if said pixel location numbered m belongs to said chosen subset CS of pixel locations and is assigned a number q(m)=1 if said pixel location numbered m does not belong to said chosen subset CS of pixel locations; and
(4) said authentication indicium I is defined by $$I = \prod_{m=1}^{N} q(m).$$

7. The apparatus of claim 1, wherein:
(1) said pixel bit values in said array of pixel values are numbered n=1, 2, ..., K·N, where K is the number of bits used to express a pixel value;
(2) said pixel bit value number n is assigned a unique prime number p(n) in a sequence of distinct prime numbers;
(3) said pixel bit value number n is assigned a number q'(n)=p(n) if said pixel bit value numbered n belongs to said chosen subset CS of pixel bit values and is assigned a number q(n)=1 if said pixel bit value numbered m does not belong to said chosen subset CS of pixel bit values; and
(4) said authentication indicium I is defined by $$I = \prod_{n=1}^{K \cdot N} q'(n).$$

8. The apparatus of claim 1, wherein:
(1) said pixel locations in said array of pixel values are numbered m=1, 2, ..., N;
(2) said pixel location number m is assigned a number r(m)=1 if said pixel location numbered m belongs to said chosen subset CS of pixel locations and is assigned a number r(m)=0 if said pixel location numbered m does not belong to said chosen subset CS of pixel locations; and
(3) said indicium I is defined by $$I = \sum_{m=1}^{N} r(m) Z^{-m},$$

where Z is a selected real number greater than 1.

9. The apparatus of claim 8, wherein said real number Z is selected to be equal to 2.

10. The apparatus of claim 1, wherein:
(1) said pixel bit values in said array of pixel values are numbered n=1, 2, ..., K·N, where K is the number of bits used to express a pixel value;
(2) said pixel bit value number n is assigned a number r'(n)=1 if said pixel bit value numbered m belongs to said chosen subset CS of pixel bit values and is assigned a number r'(n)=0 if said pixel bit value numbered m does not belong to said chosen subset CS of pixel bit values; and
(3) said indicium I is defined by $$I = \sum_{n=1}^{K \cdot N} r'(n) Z^{-n},$$

where Z is a selected real number greater than 1.

11. The apparatus of claim 10, wherein said real number Z is selected to be equal to 2.

12. The apparatus of claim 1, wherein said authentication mechanism provides an overlay of polygons $p_g$, numbered g=1, 2, ..., G (G≧2), of substantially identical shape and size that overlays said array of pixel locations, assigns each pixel location in said array of pixel locations to one polygon in the overlay, assigns at least one pixel location in said chosen subset CS to each polygon in the overlay, computes a sub-indicium $(g, I_g)$ for each polygon $p_g$ that indicates the members of said chosen subset CS that are assigned to the polygon $p_g$, and determines said authentication indicium I from the collection of sub-indicia $\{(g, I_g)\}_g$ determined for the polygons $p_g$ in the overlay.

13. The apparatus of claim 12, wherein said polygons $p_g$ in said overlay are drawn from a group of polygons consisting of isoceles triangles, equilateral triangles, squares, rectangles, parallelograms, equilateral regular hexagons and non-equilateral regular hexagons.

14. The apparatus of claim 1, wherein said chosen subset CS of said array PA of pixel locations is chosen so that, for any pixel in said pixel array PA a circle, centered at this pixel and having a diameter at least equal to a selected threshold number D, contains at least one pixel belonging to said chosen subset CS, where D is at least four times the pixel-to-pixel nearest neighbor distance.

15. The apparatus of claim 1, wherein said chosen subset CS of said array PA of pixel locations includes at least one of the following patterns of pixels: a substantially straight line containing contiguous pixels, a substantially straight line containing non-contiguous pixels, a curved line containing contiguous pixels, and a curved line containing non-contiguous pixels.

16. A method for producing a self-authenticating digital image, the method comprising the steps of:
forming a digitally expressed image of a selected view as an array of pixel values, using a digital camera, with each pixel value corresponding to a pixel in an array of pixels;
determining position information that includes at least one of the location of the digital camera, the angular orientation of the digital camera and the time at which a digital image was formed;
receiving a selected digital image from the digital camera;
receiving the position information for the digital image;
combining the digital image with the position information to form a modified digital image in which each pixel value in a chosen subset CS of the array of pixels is reformed as a modified pixel value array to contain a portion of the position information, and storing the modified pixel value array in a digital image storage mechanism; and
providing an authentication indicium that indicates the chosen subset CS of the array of modified pixel values;
receiving putative position information for a selected digital image;

using the authentication indicium to retrieve the position information from the digital image storage mechanism;

comparing the putative position information with the retrieved position information; and taking at least one of the following actions: (i) withholding authentication of the selected digital image if the putative position information does not substantially agree with the retrieved position information and (ii) authenticating the selected digital image if the putative position information substantially agrees with the retrieved position information.

17. The method of claim 16, further comprising the step of displaying selected information contained in said modified digital image in at least one of electronically perceptible form, visually perceptible form and audibly perceptible form.

18. The method of claim 16, wherein said step of determining said position information comprises:

receiving SATPS signals transmitted from at least three SATPS signal sources; and receiving and processing the SATPS signals to determine the location of said digital camera.

19. The method of claim 18, further comprising the step of providing an angular orientation determination mechanism, attached to said digital camera, for determining the angular orientation of said digital camera at least partly independently of said SATPS signals received from said SATPS signal sources.

20. The method of claim 18, further comprising the steps of:

providing at least three SATPS signal antennas, attached to said digital camera and arranged non-collinearly to each receive SATPS signals transmitted from said at least three SATPS signal sources; and receiving and processing SATPS signals from the SATPS antennas to determine the location of each of the SATPS antennas and the angular orientation of a plane containing the at least three SATPS antennas and of a selected line lying in this plane, where this selected line has a known angular orientation relative to said digital camera.

21. The method of claim 16, further comprising the steps of:

(1) numbering said pixel locations in said array of pixel values m=1, 2, . . . , N;

(2) assigning said pixel location number m a unique prime number p(m) in a sequence of distinct prime numbers;

(3) assigning said pixel location number m a number q(m)=p(m) if said pixel location numbered m belongs to said chosen subset CS of pixel locations and is assigned a number q(m)=1 if said pixel location numbered m does not belong to said chosen subset CS of pixel locations; and (4) defining said authentication indicium I as $$I = \prod_{m=1}^{N} q(m).$$

22. The method of claim 16, further comprising the steps of:

(1) numbering said pixel bit values in said array of pixel values n=1, 2, . . . , K·N, where K is the number of bits used to express a pixel value;

(2) assigning said pixel bit value number n a unique prime number p(n) in a sequence of distinct prime numbers;

(3) assigning said pixel bit value number n a number q'(n)=p(n) if said pixel bit value numbered n belongs to said chosen subset CS of pixel bit values and is assigned a number q(n)=1 if said pixel bit value numbered m does not belong to said chosen subset CS of pixel bit values; and (4) defining said authentication indicium I as $$I = \prod_{n=1}^{K \cdot N} q'(n).$$

23. The method of claim 16, further comprising the steps of:

(1) numbering said pixel locations in said array of pixel values m=1, 2, . . . , N;

(2) assigning said pixel location number m a number r(m)=1 if said pixel location numbered m belongs to said chosen subset CS of pixel locations and is assigned a number r(m)=0 if said pixel location numbered m does not belong to said chosen subset CS of pixel locations; and (3) defining said indicium I by $$I = \sum_{m=1}^{N} r(m) Z^{-m},$$

where Z is a selected real number greater than 1.

24. The method of claim 23, further comprising the step of selecting said number Z to be equal to 2.

25. The method of claim 16, further comprising the steps of:

(1) numbering said pixel bit values in said array of pixel values as n=1, 2, . . . , K·N, where K is the number of bits used to express a pixel value;

(2) assigning said pixel bit value number n a number r'(n)=1 if said pixel bit value numbered m belongs to said chosen subset CS of pixel bit values and is assigned a number r'(n)=0 if said pixel bit value numbered m does not belong to said chosen subset CS of pixel bit values; and (3) defining said indicium I by $$I = \sum_{n=1}^{K \cdot N} r'(n) Z^{-n},$$

where Z is a selected real number greater than 1.

26. The method of claim 25, further comprising the step of selecting said number Z to be equal to 2.

27. The method of claim 16, wherein said step of providing said authentication mechanism comprises the steps of:

providing a set of polygons $p_g$, numbered g=1, 2, . . . , G(G≧2), of substantially identical shape and size that overlays said array of pixel locations;

assigning each pixel location in said array of pixel locations to one polygon in the overlay;

assigning at least one pixel location in said chosen subset CS to each polygon in the overlay;

computing a sub-indicium $(g, I_g)$ for each polygon $p_g$ that indicates the members of said chosen subset CS that are assigned to the polygon $p_g$; and determining said authentication indicium I from the collection of sub-indicia $\{(g, I_g)\}_g$ determined for the polygons $p_g$ in the overlay.

28. The method of claim 27, further comprising the step of drawing said polygons $p_g$ in said overlay from a group of polygons consisting of isoceles triangles, equilateral triangles, squares, rectangles, parallelograms, equilateral regular hexagons and non-equilateral regular hexagons.

29. The method of claim 16, further comprising the step of choosing said chosen subset CS of said array PA of pixel locations so that, for any pixel in said pixel array PA a circle, centered at this pixel and having a diameter at least equal to a selected threshold number D, contains at least one pixel belonging to said chosen subset CS, where D is at least four times the pixel-to-pixel nearest neighbor distance.

30. The method of claim 16, further comprising the step of choosing said subset CS of said array PA of pixel locations to include at least one of the following patterns of pixels: a substantially straight line containing contiguous pixels, a substantially straight line containing non-contiguous pixels, a curved line containing contiguous pixels, and a curved line containing non-contiguous pixels.

* * * * *